US011918032B2

(12) United States Patent
Holderman et al.

(10) Patent No.: US 11,918,032 B2
(45) Date of Patent: Mar. 5, 2024

(54) PACKER STATION OF A PACKAGING APPARATUS AND SYSTEM

(71) Applicant: MPI, LLC, Las Vegas, NV (US)

(72) Inventors: Mark W. Holderman, Spokane, WA (US); Gregory A. Russell, Spokane, WA (US)

( * ) Notice: Subject to any disclaimer, the term of this patent is extended or adjusted under 35 U.S.C. 154(b) by 1365 days.

(21) Appl. No.: 16/380,167

(22) Filed: Apr. 10, 2019

(65) Prior Publication Data

US 2019/0328033 A1 Oct. 31, 2019

Related U.S. Application Data

(63) Continuation of application No. PCT/US2019/026711, filed on Apr. 10, 2019.

(60) Provisional application No. 62/783,394, filed on Dec. 21, 2018, provisional application No. 62/662,918, filed on Apr. 26, 2018.

(51) Int. Cl.

| | |
|---|---|
| ***A24C 5/06*** | (2006.01) |
| ***B65B 1/32*** | (2006.01) |
| ***B65B 1/06*** | (2006.01) |
| ***A24C 5/39*** | (2006.01) |
| ***A24C 5/34*** | (2006.01) |
| ***B65B 1/26*** | (2006.01) |
| ***B31B 50/00*** | (2017.01) |
| ***B31B 50/36*** | (2017.01) |
| ***B31B 50/04*** | (2017.01) |
| ***B31B 50/52*** | (2017.01) |

(Continued)

(52) U.S. Cl.

CPC .............. *A24C 5/06* (2013.01); *A24C 5/3424* (2013.01); *A24C 5/397* (2013.01); *A24C 5/399* (2013.01); *B31B 50/005* (2017.08); *B31B 50/006* (2017.08); *B31B 50/04* (2017.08); *B31B 50/36* (2017.08); *B31B 50/52* (2017.08); *B65B 1/06* (2013.01); *B65B 1/26* (2013.01); *B65B 1/32* (2013.01); *B65D 3/06* (2013.01); *B31B 2110/10* (2017.08)

(58) Field of Classification Search

None

See application file for complete search history.

(56) References Cited

U.S. PATENT DOCUMENTS

| | | | |
|---|---|---|---|
| 2,925,347 | A | 2/1960 | Cummings |
| 2,982,074 | A | 5/1961 | Shiu |

(Continued)

OTHER PUBLICATIONS

Premium Vials, https://www.premiumvials.com/cones-coolbox-120-original-filling-machine-98mm-109mm/?gclid=Cj0KCQiAsvTxBRDkARIsAH4W_j_KMdv7et3w4Ow2EcsRWqUN_iPRYNFkH3npHZfX-v3f_ISGOINrUdgaAsoQEALw_wcB, 7 pages, USA.

(Continued)

*Primary Examiner* — Dionne W. Mayes

(74) *Attorney, Agent, or Firm* — Aronberg Goldgehn Davis and Garmisa

(57) ABSTRACT

The technology described herein generally relates to an automated packaging apparatus and system that packages loose particles into a conical container as well as the final folded packages. More specifically, loose plant matter, such as crumbled dried leaves, are supplied to successive paper cones. The apparatus packs the crumbled leaves into the cones, closes the wide top portion of the cone into a precise shape, and then runs a quality control check to ensure that the final filled cone meets preset specifications.

13 Claims, 34 Drawing Sheets

(51) Int. Cl.
*B65D 3/06* (2006.01)
*B31B 110/10* (2017.01)

(56) References Cited

U.S. PATENT DOCUMENTS

| | | | |
|---|---|---|---|
| 3,028,029 | A | 4/1962 | Morse |
| 3,092,944 | A | 6/1963 | Wise |
| 3,591,041 | A | 7/1971 | DiGrande et al. |
| 3,618,642 | A | 11/1971 | Beaulieu |
| 4,002,005 | A | 1/1977 | Mueller et al. |
| 4,188,768 | A | 2/1980 | Getman |
| 4,608,809 | A | 9/1986 | Francis |
| 4,691,500 | A | 9/1987 | Danforth |
| 4,729,206 | A | 3/1988 | Francis |
| 4,782,644 | A | 11/1988 | Haarer |
| 5,918,765 | A | 7/1999 | Blankenship |
| 6,044,886 | A | 4/2000 | Mueller |
| 7,032,359 | B1 | 4/2006 | Robert |
| 7,918,334 | B2 | 4/2011 | Gaetano |
| 9,125,435 | B1 | 9/2015 | Sinclair, Jr. |
| 9,776,751 | B2 | 10/2017 | Lukes |
| 10,856,574 | B2 | 12/2020 | Ghiotti |
| 10,946,987 | B2 | 3/2021 | Ghiotti |
| 2003/0185948 | A1 | 10/2003 | Garwood |
| 2007/0000567 | A1 | 1/2007 | Marletto |
| 2008/0145489 | A1 | 6/2008 | Green |
| 2012/0230809 | A1 | 9/2012 | Bellante |
| 2020/0068947 | A1* | 3/2020 | Leadbeater et al. ..... A24C 5/34 |

OTHER PUBLICATIONS

Kynd Custom Packaging, https://kyndpackaging.com/pre-roll-packaging/, 9 pages, USA.

Custom Cones USA, https://customconesusa.com/pre-roll-machines/, 5 pages, USA.

Futurola, https://futurolausa.com/36-knockbox-accessories, 2 pages, USA.

Ganjarunner, https://ganjarunner.com/shop/medical-marijuana-products/pre-rolls/ganjagold-blue-tarantula/, 7 pages, USA.

* cited by examiner

FIG 6L
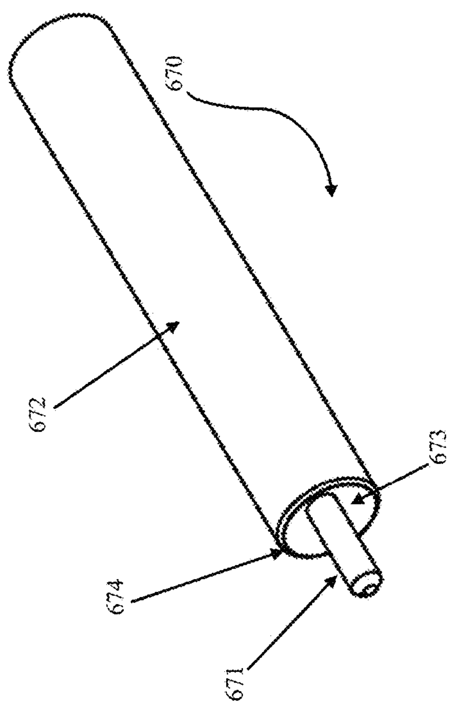
FIG 6N
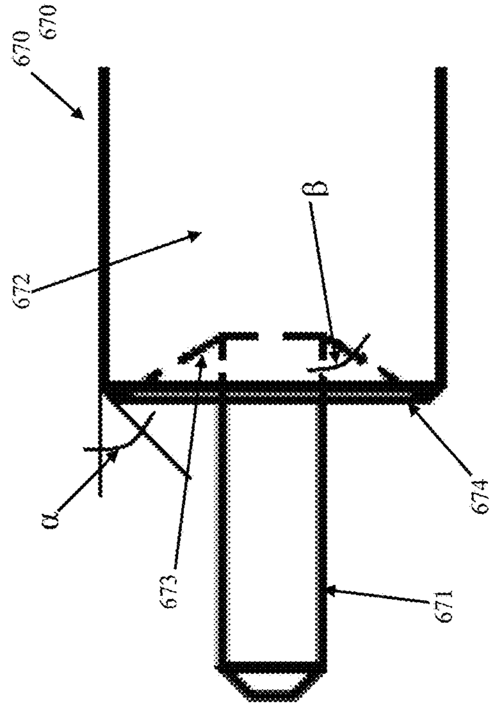
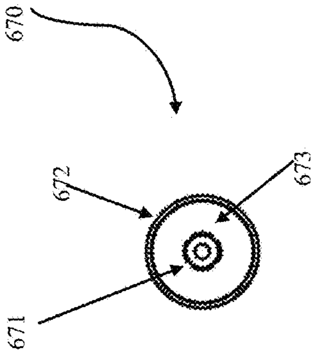
FIG 6M

PACKER STATION OF A PACKAGING APPARATUS AND SYSTEM

INCORPORATION BY REFERENCE

This application claims priority to and incorporates by reference in their entirety and for all purposes U.S. Provisional Patent Application Ser. No. 62/662,918 filed on behalf of Mark W. Holderman and Gregory August Russell, U.S. Provisional Patent Application Ser. No. 62/783,394 filed on behalf of Mark W. Holderman and Gregory August Russell, and PCT/US19/26711 filed on behalf of Mark W. Holderman and Gregory August Russell.

BACKGROUND

Prior to the development of the present apparatus and system, paper cones were filled by hand. People would individually stuff product, such as leaves, into a single cone, and mechanically tamp down the leaves. Alternately, numerous cones could be placed in what is essentially a honeycomb structure with holes that accommodate the cones. Crumbled leaves were then scattered over the holes containing the cones and vibrations or mechanical tamping was used to pack the leaves into the cones.

Each of the foregoing resulted in inaccurate and non-uniformly filled cones. The mechanical tamping often left the leaves too compacted. Sometimes the leaves at the bottom of the cone would be packed too much, while the leaves toward the top of the cone would remain too loose. The mechanical pressure had a tendency to rip the paper cones. Simply relying on vibrations to fill the cones would often result in leaves that were too loose.

These problems were often compounded by the type of plant matter used. Specifically, for plant matter containing a relatively high oil content, the crumbled leaves tended to exhibit a sticky quality that resulted in clumping of the leaves together. The clumped leaves negatively affected the utility of the vibration method because the vibrations alone were not sufficient to break up the clumps. Similarly, the tamping method simply resulted in clumps that were more tightly packed together, exacerbating the problem. In both cases, the clumps tended to lodge in the narrow part of the cone creating air gaps or otherwise non-uniform packing of the plant material within the cone.

Non-uniform packing creates a number of problems. For example, it can affect the weight of the final product. When clumps get packed in with more loose plant matter, the density of the clumps can result in more than the desired amount of plant matter being packed into the cone. The clumps tend to burn at a different rate, disrupting the natural and correct burn rate of a correctly and uniformly packed cone. When clumps create air-gaps, the burn rate of the plant matter can be negatively affected because the lack of solid contact among the plant matter can result in an extinguishing of the plant matter. The density of the clumps can disrupt the flow of air through the plant matter, and act like a blockage in a straw.

Filling cones by hand, or with the honeycomb type packing device also necessitates closing each of the cones by hand. Using those methods, a person was required to manually manipulate each cone and fold the open end to seal in the plant material and prevent it from falling out. Often the cones would simply be closed by twisting the paper on top of the cone together to completely close and seal the top of the cone. That manual process is taxing on a person's hands and limits the number of cones that can be filled in a given amount of time. It also tends to result in non-uniform folds/twisted closures as people tend to have different techniques for folding/twisting and dexterity becomes more limited as hands and fingers become more fatigued.

SUMMARY

The present system provides an apparatus that accurately and uniformly fills paper cones with loose particles and closes the cones to prevent the particles from escaping the cones. While embodiments may generally be described herein as filling the cones with crumbled plant matter, such as crumbled dried leaves, it should be understood that any loose particles that could fit within the cone could be used as a filling for the cone without departing from the general scope of the apparatus and system. For simplicity, all such loose particles will simply be referred to herein as "leaves," but the use of that term herein in no way limits the apparatus to only packaging organic plant matter. It should be understood that while "paper" is a common substance to be used for cones, that term is used generically herein for any relatively thin, flexile, flammable substrate and is not strictly limited to traditional paper. It should be understood that the term "cone" need not be a traditional cone with a point at one end, but may be of any generally cylindrical shape or shape having a greater length than width (or diameter, where the term "width" as it is used in describing the width of an object having a circular cross section is the diameter), though preferably the shape of a truncated traditional cone.

The present apparatus and system overcome the shortcomings of the previously described manual methods by ensuring that the leaves are uniformly and consistently packed into the cones. The process is automated, allowing for consistent packaging and uniformity in the final product. It expedites the overall process of packing the cones. The present apparatus and system includes a number of sub-components that individually perform packing functions. The sub-components each individually overcome different problems that occur when manually packaging leaves in cones. For example, an embodiment of the present apparatus and system includes a leaf hopper and trough conveyor. It precisely measures units of leaves for packaging, breaks up clumped leaves initially and prevents clumping of the leaves as the leaves are transferred through the apparatus. A conveyor, such as a carousel, manages the flow of cones into the system. It holds large quantities of cones and moves them into the precise position for packaging while preventing undesirable crimping and folding of the cone that could otherwise affect the quality of the finished, packed cone.

Another sub-component is the packing sub-assembly. It includes a hopper that feeds leaves into the cone. A combination of vibrations and successive applications of pulsed air may be used to ensure even distribution and uniform packing of leaves in the cone. A vacuum system is further connected to remove any stray leaves that failed to properly be packed into the cone and thereby prevents unnecessary buildup and waste of leaves.

A folder sub-component and injector sub-component (which in some embodiments are incorporated into a single sub-component while in other embodiments are arranged as separate sub-components) complete the packaging of the cone. The folder sub-component properly orients the cone. Folding fingers precisely bend a portion of the cone and a folding tip compresses the bent portion of the cone to close it. Depending on the product being packaged into the cones, it may be advantageous to inject a further substance, such as oil, into to the packed cone. In some instances the oil may be derived from the same family of product that is being packed into the cone, such as an oil derived from the same plant family as the leaves that are used to fill the cone. In such instances, after compressing the cone with the folding tip, an injector needle penetrates the cone and is withdrawn, leaving a deposit of the further substance through the leaves in the cone as the needle is withdrawn. This creates a line, or core, of the further substance through the leaf filled cone.

In one embodiment, after completing the folding, and if desired injecting, steps, the packaged cone is transferred to a quality control station. The quality control station checks to ensure the packaged cone meet the necessary quality parameters, for example, weight, shape, and color. Passing cones are transferred to an appropriate receptacle, while failing cones are rejected. Injecting could also be accomplished separately and after inspection.

BRIEF DESCRIPTION OF THE DRAWINGS

FIG. 6L is a perspective view of an embodiment of a folder tip with an axial pin.

FIG. 6M is a plan view of an embodiment of a folder tip with an axial pin.

FIG. 6N is a cross-sectional side view of an embodiment of a folder tip with an axial pin.

DETAILED DESCRIPTION OF EMBODIMENTS

Figure 1A:
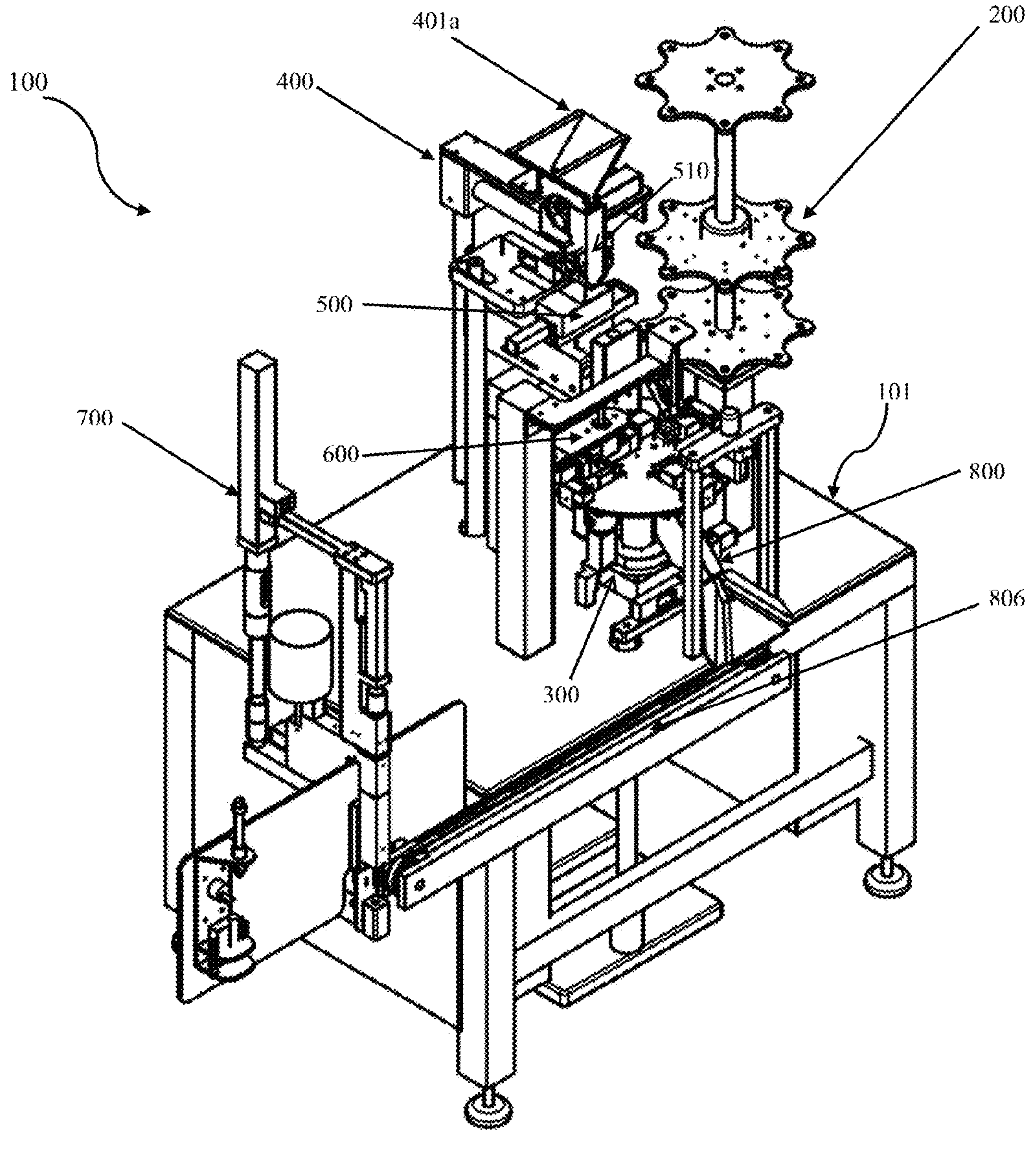
FIG. 1A is a perspective view of an embodiment of the apparatus and system depicting the relationship between various sub-systems of the apparatus.

Throughout the specification, wherever practicable, like structures will be identified by like reference numbers. In some figures, components, such as additional electrical connections and tubing (such as vacuum tubing and pneumatic tubing) have been omitted for clarity in the drawings. Additionally, in some figures repetitive structures, such as multiple actuators have been omitted. In such cases exemplary components are provided for explanatory purposes and it should be understood that other similar devices in the drawings may be provided with similar components. Unless expressly stated otherwise, the term "or" means "either or both" such that "A or B" includes A alone, B alone, and both A and B together.

Figure 1B:
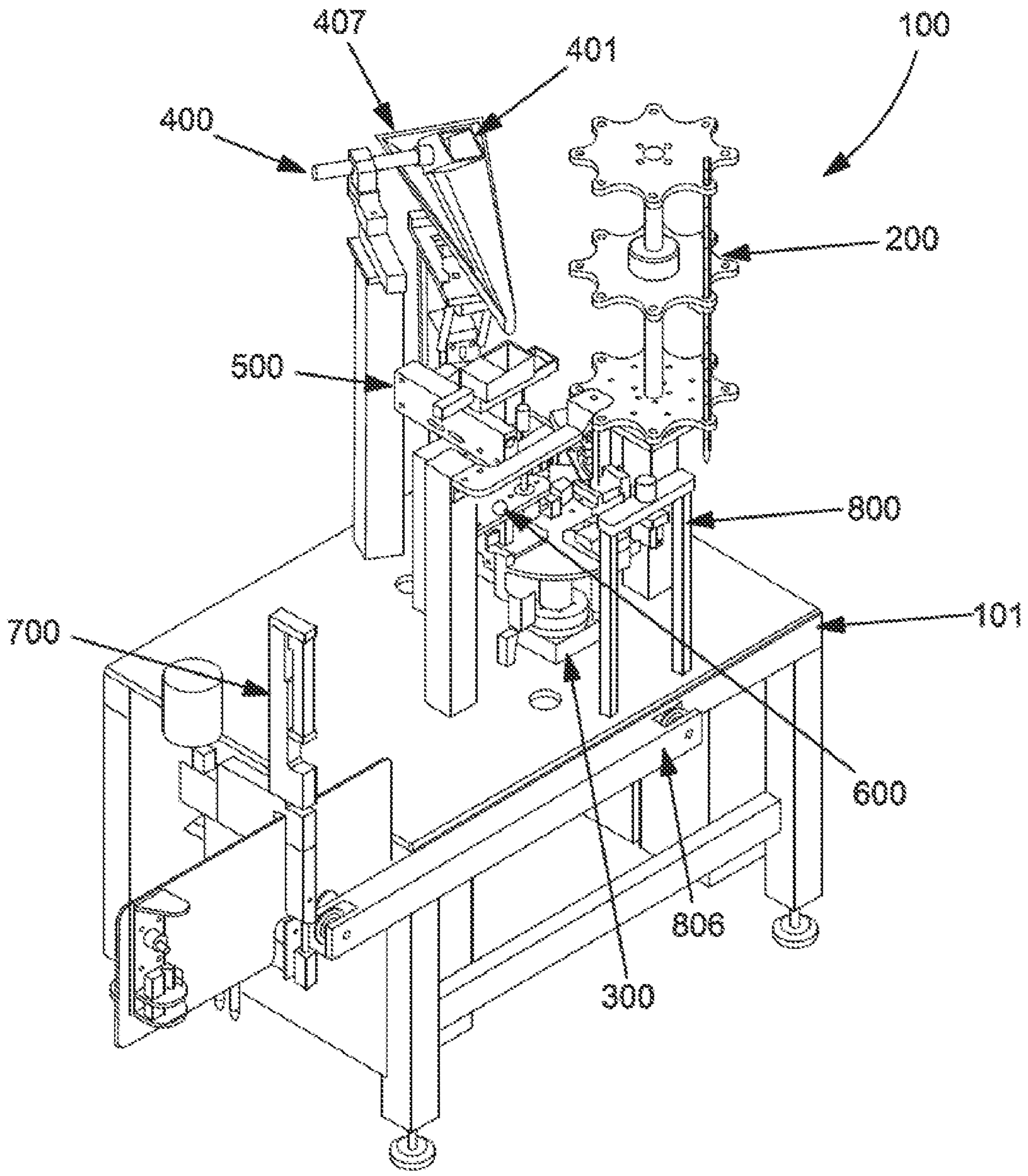
FIG. 1B is a perspective view of an alternative embodiment of the apparatus and system depicting the relationship between the various sub-systems of the apparatus.

FIG. 1A and FIG. 1B generally depict embodiments of a packaging assembly 100. Embodiments may include a carousel 200, a cone conveyor 300, a hopper assembly 400, a leaf conveyor 407, a grinder hopper 401, a packing station 500, a weigh station 510, a folder station 600, and a quality control station 800. Additionally, the packaging assembly may include a conveyor 806, and an injector station 700 (which may be integrated with the folder station or a separate station). The various components may be mounted to a table 101.

The packaging assembly is also equipped with a number of actuators. The actuators move the various components of the assembly into their proper positions. In one embodiment, the actuators are generally pneumatic actuators and electric motors, though it should be appreciated by one of ordinary skill in the art that any actuator could be used. By way of non-limiting example, continuous speed motors, variable speed motors, servo motors, hydraulics, or magnetic actuators could be used. By way of further example, an actuator could be in the form of a simple valve or switch that the control system operates to permit a hydraulic or pneumatic fluid to flow through the system and provide the force required by the system. A vacuum pump and vacuum tubing may also be utilized to control airflow in the system.

Figure 10:
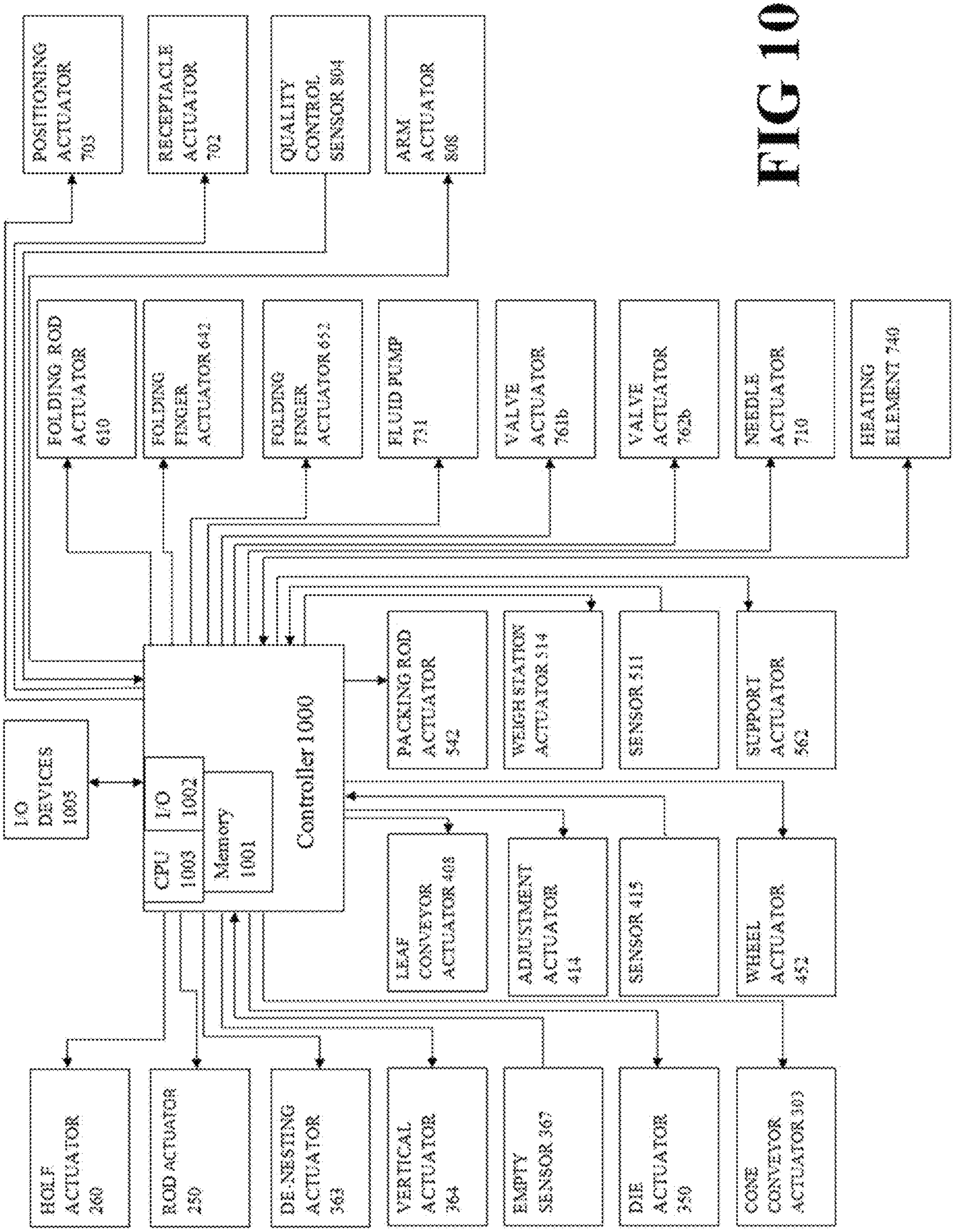
FIG. 10 is a schematic of an embodiment of a control system in connection with a plurality of actuators and sensors.

An electrical control system (one embodiment of which is described in further detail with respect to FIG. 10) is used to monitor and control the operation of the system and packaging assembly. The electrical control system may include dedicated circuits, programmable computer hardware, firmware, software, controllers, or a combination thereof. The control system coordinates the operation of the apparatus and system and particularly coordinates the actuators and the vacuum as well as utilizing sensor data, preset parameters stored in the control system, or a combination thereof. While it generally is advantageous to utilize a control system of a self-contained, locally oriented computer (with accompanying input and output devices such as a display, keyboard, mouse, touch screen, voice command control, etc.) to reduce latency in the feedback and command loop between the sensors, computer, and actuators, it is contemplated that parts of the control system could be organized in a distributed manner, with sub-control systems operating portions of the packaging system while networked with a main computer controller, or even that portions of the control system could be located off-site and connected over the internet.

In one embodiment, a computer monitors the sensors of the packaging assembly, and coordinates the operation of the actuators of the packaging assembly. Simultaneously, the computer records data respecting the operation of the packaging assembly. For example, the computer records the time each actuator is activated. The computer system may further compile the number of operations of each actuator to determine whether a completed product should have been created. For example, the computer identifies that the actuators of the carousel were activated, followed by the activation of the de-nesting fingers. A feedback sensor on the de-nesting fingers informs the computer that a cone was successfully withdrawn from the carousel and the computer logs that data. The computer then records activation of the cone conveyor and the activation of a weigh station sensor and weigh station actuator (indicating that product has been fed to the cone). The computer system logs the activation of the packing rod actuator followed by the activation of folding finger actuators (indicating that the filled cone has been completed), the computer then logs the die actuator (releasing the filled cone) followed by sensor feedback from quality control sensors (such as recording the weight of the cone, an image of the cone, or a simple check that the cone is present). The computer then records whether the reject actuator was activated to determine whether the cone was accepted or rejected. The computer records the subsequent activation of the actuators of the fluid injecting station, including the operation of the fluid pumps to record whether the cone was filled with a fluid core, and how much fluid was deposited in the cone. Subsequent quality control data (and acceptance/rejection data) as described previously may be recorded. In some embodiments the fluid filling occurs prior to any quality control. By coordinating the recording of the data pertaining to the actuators and sensors, the computer system is able to track individual cones as they progress through the packaging system.

When a cone is expected, but not present, the computer may log the instance and generate an alert. For example, if all actuators and sensors are logged from the extraction of a cone from the carousel to the folding station, the computer expects that a filled cone will next be present in the quality control station. If the die actuator activates and no filled cone is sensed at the quality control station, the computer can generate an alert indicating that the expected filled cone is missing. In that way, the computer system can help prevent theft of completed cones.

Also, the data can be used to assess the operation of the packaging assembly. The preferred timing of the actuators is known and stored in the memory of the computer. As the computer gathers data, it compares the actual timing against the preset value for optimal timing. If the actual data is outside of a preferred range, the computer may adjust the actual timing of one or more of the actuators (for example, the computer may activate an actuator slightly earlier than previously to bring the actuator into the proper timing) or may generate an alert to have a technician reset the operation of the assembly (or actuator). The control system may be connected to the internet such that data regarding the operation of the actuators and sensors may also be transmitted to a remote computer for monitoring the operation of the assembly remotely. In one embodiment, when the computer compiles data regarding the coordinated activation of the actuators and sensors indicating that a cone has been filled and quality checked, the computer increments the number of cones filled (subtracting and logging the number of cones rejected). The computer system may then generate a report indicating the number of cones filled and accepted over a particular time period.

In general, the components are arranged to facilitate the movement of a cone through the packaging system. In one embodiment, the cone conveyor is adapted to move the cones from station to station to effectuate filling of the cones. For example, in the embodiment of FIG. 1A, when the conveyor is moved in the forward direction (which in FIG. 1A corresponds to the counterclockwise direction, though it should be understood that "forward" simply means a direction that moves a point on cone conveyor from a starting point successively past stations of the packaging apparatus before returning that point to the starting point), the cone conveyor moves a cone from the carousel to the packing station, then to the folding station, then to the quality control station before returning to the starting point of the carousel and receiving another cone.

Figures 2A, 2C:
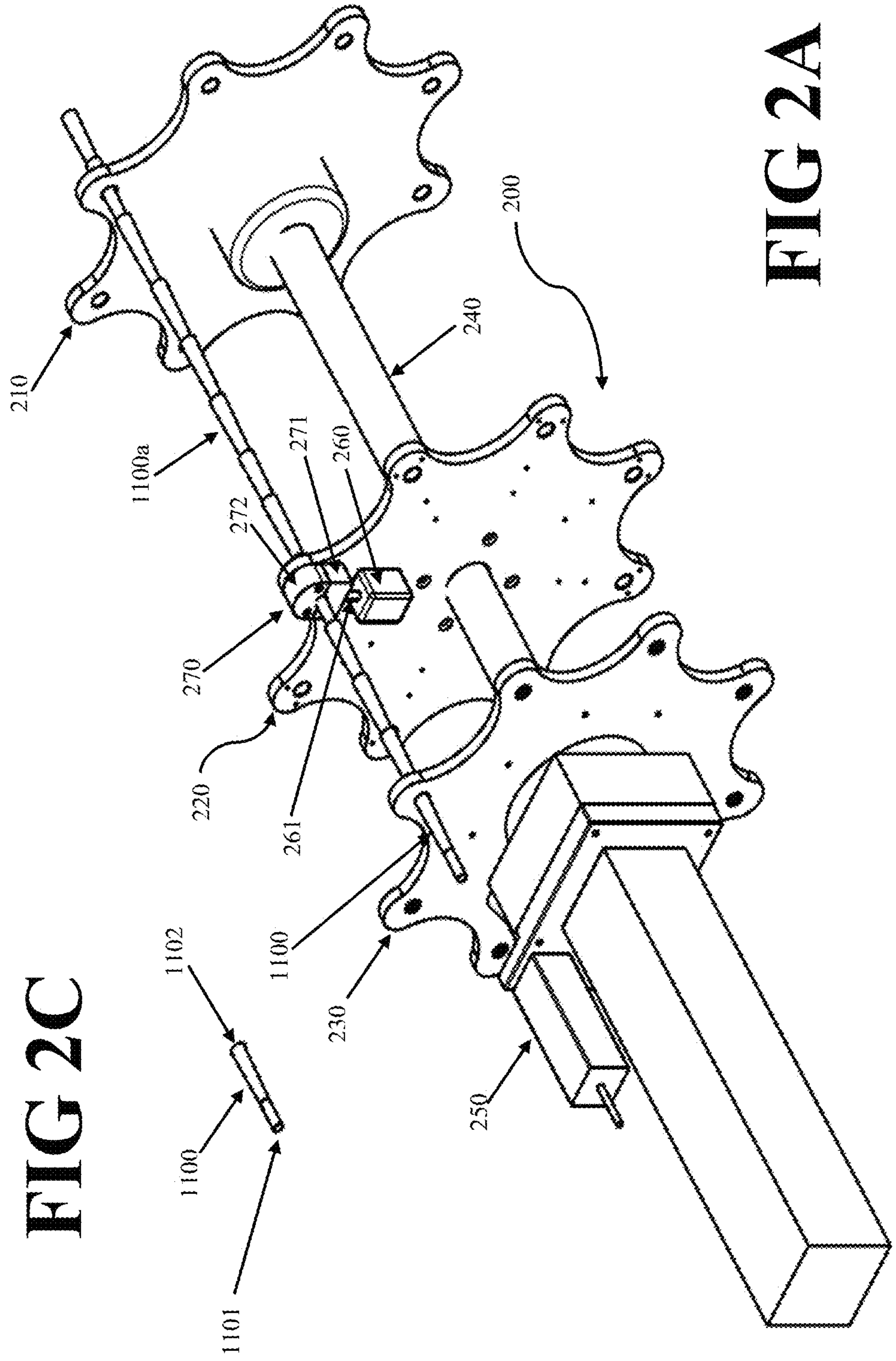
FIG. 2A is a perspective view of an embodiment of the carousel.
FIG. 2C is a perspective view of an embodiment of a cone.

FIG. 2A generally depicts an embodiment of the carousel 200. It includes at least one plate. It should be appreciated that a "plate" could be of any size and shape, and is not limited to a flat plate as shown in FIG. 2A. Rather, a flat, generally circular plate (as shown) can effectively and economically convey the cones in the present system. In the embodiment shown, the carousel includes three plates 210, 220, 230 arranged vertically along a support rod 240. The support rod is connected to a rod actuator 250. The rod actuator 250 rotates the support rod and thereby rotates the carousel including plates 210, 220, 230.

Figure 2B:
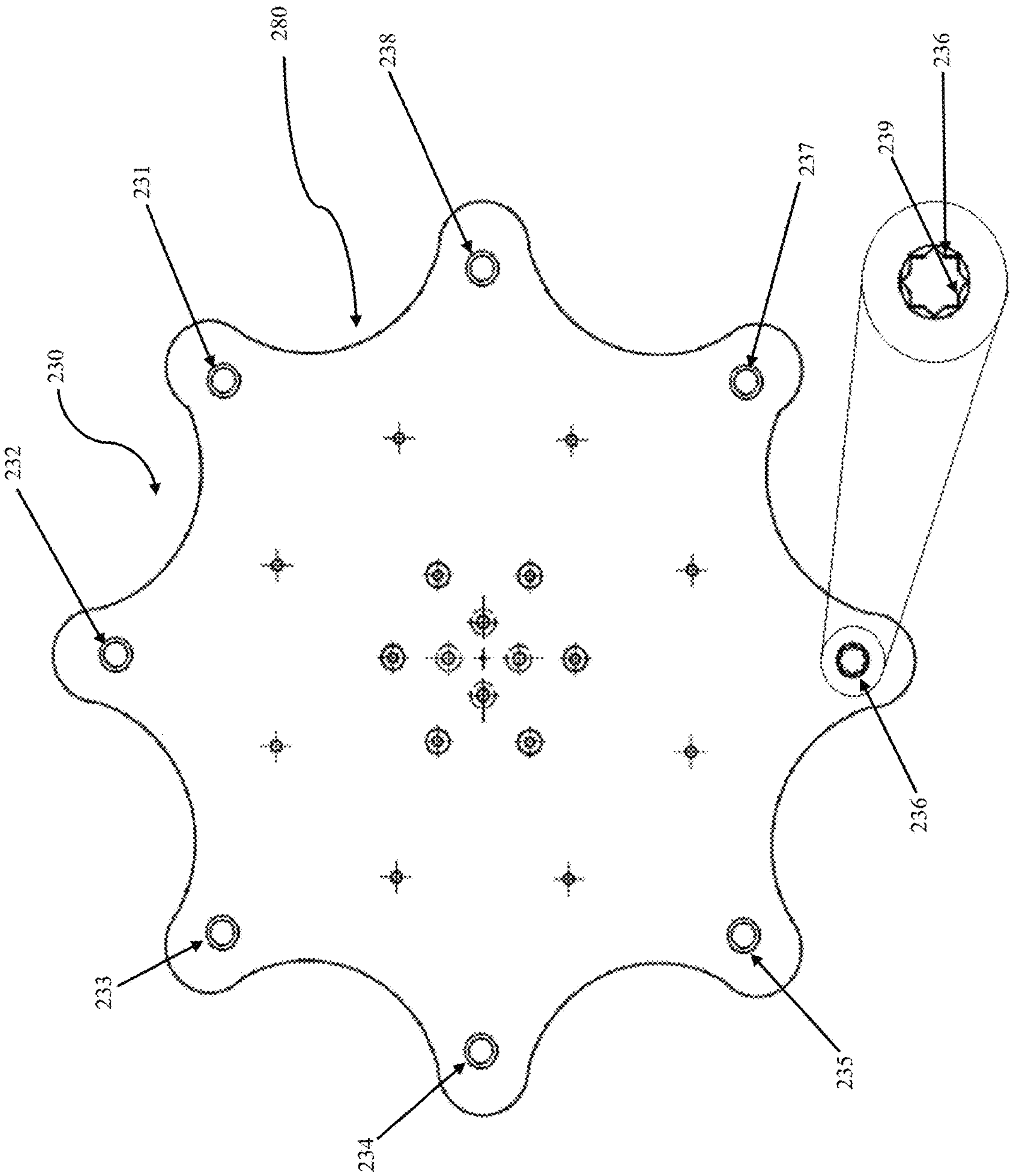
FIG. 2B is a close-up plan view of a portion of one embodiment of a plate of the carousel exhibiting a geometric hole.

With reference to FIGS. 2A and 2B, each of the plates includes a series of holes located circumferentially along an outer perimeter (see generally, 280) of the plate. For example, in FIG. 2B, plate 230 includes holes 231, 232, 233, 234, 235, 236, 237, and 238. Preferably, the holes of the upper two plates, 210 and 220, have diameters that are the size of or slightly larger than the largest diameter of the cones 1100. Thus, the cones may pass freely through the holes of those two plates. In one embodiment, the holes of plate 230 have a diameter that is less than the largest diameter of the cones, or have a geometric shape that results in frictional engagement of a cone placed in the hole. In one embodiment, the holes of plate 220 each include a hole actuator and a hole clamp (for explanatory purposes, only one hole actuator and hole clamp is depicted). As an example, FIG. 2A depicts hole actuator 260 and hole clamp 270. The hole actuator actuates the hole clamp to apply and release pressure on the stack of cones such that when pressure is applied, the cones are prevented from passing through the associated hole on plate 220. That assists in relieving the pressure on the cone that is frictionally engaged with the geometric hole 236 and prevents the weight of the cone stack 1100*a* from prematurely pushing cones through the geometric hole. When pressure is released, the cones may pass through the hole associated with the actuator and clamp on plate 220 under the weight of the stack of cones 1100*a*. In one embodiment the actuator 260 includes a piston 261 that connects to a movable clamp block 271. A fixed clamp block 272 is fixed to plate 220. The actuator 260 actuates the piston to slide the movable clamp block 271 toward and away from the fixed clamp block 272 to apply or release pressure on the cone stack 1100*a*. Thus, the actuator moves the clamp to create and alleviate a restriction at the associated hole so as to prevent or allow cones to pass through the hole. It should be appreciated that alternative clamps could be used such as a constricting (or sphincter) clamp that encircles the cones such that the actuator constricts and releases the clamp to apply and release pressure on the cone stack.

Respecting the cones, cone 1100 of FIG. 2C is an example of a cone that may be packed using the present system. The cones are stacked in a nested fashion in the carousel (see, generally, 1100*a*). The cones exhibit a proximal end 1101 and a distal end 1102 that are located opposite one another and joined by a middle section. The cones are hollow such that air may enter the distal end, be drawn through the cone, and exit the proximal end. Preferably, the distal end exhibits a diameter that is larger than the diameter of proximal end.

Preferably, each of the holes 231, 232, 233, 234, 235, 236, 237, and 238 on the bottom plate 230 is not circular. Rather, as shown in FIG. 2B which depicts an exemplary hole 236 in an expanded view, the wall 239 of each hole each may include a geometric shape. As used herein, "geometric" means that the shape is not a circle. Preferably, the geometric shape is an eight pointed star. The use of a hole with a wall having a geometric shape reduces the size of the hole so that it is smaller than the largest circumference of the cone. Thus, a cone will not pass through the hole 236 under its own weight, but instead must be forced through. The preferred size of the geometric shape is only slightly smaller than the greatest circumference of the cone so that as the cone is forced through the hole, the paper cone resiliently deforms and the geometric shape prevents plastic deformation of the cone, such as a crease in the cone. In one embodiment, the geometric shape is formed in the plate by cutting a hole that has a geometric shape into the plate. Alternately, a hole of any shape, including circular, could be cut into the plate and that hole could be filled with a material, such as a molded resin, plastic, or rubber, that surrounds the wall of the hole and that has an interior hole that is a geometric shape.

In one embodiment, the cone is extracted from the carousel 200 by being pulled down through the geometric hole. An actuator activates, for example, a clamp or a suction cup to temporarily attach to the cone and pull the cone from the carousel 200. It should be appreciated that an alternative carousel in the form of a flexible conveyor, in place of rigid plates, could be utilized to move stacks of cones into position proximal to the cone conveyor so as to enable the transfer of cones from the carousel to the cone conveyor. It should be appreciated that while one embodiment uses three plates, an alternate embodiment could use more plates and more actuators to relieve the weight of taller stacks of cones. Alternately, fewer plates could be used, and depending on the weight of the stack of cones, a simplified embodiment could eliminate the use of actuators to relieve the weight of the stacks of cones.

Figure 3A:
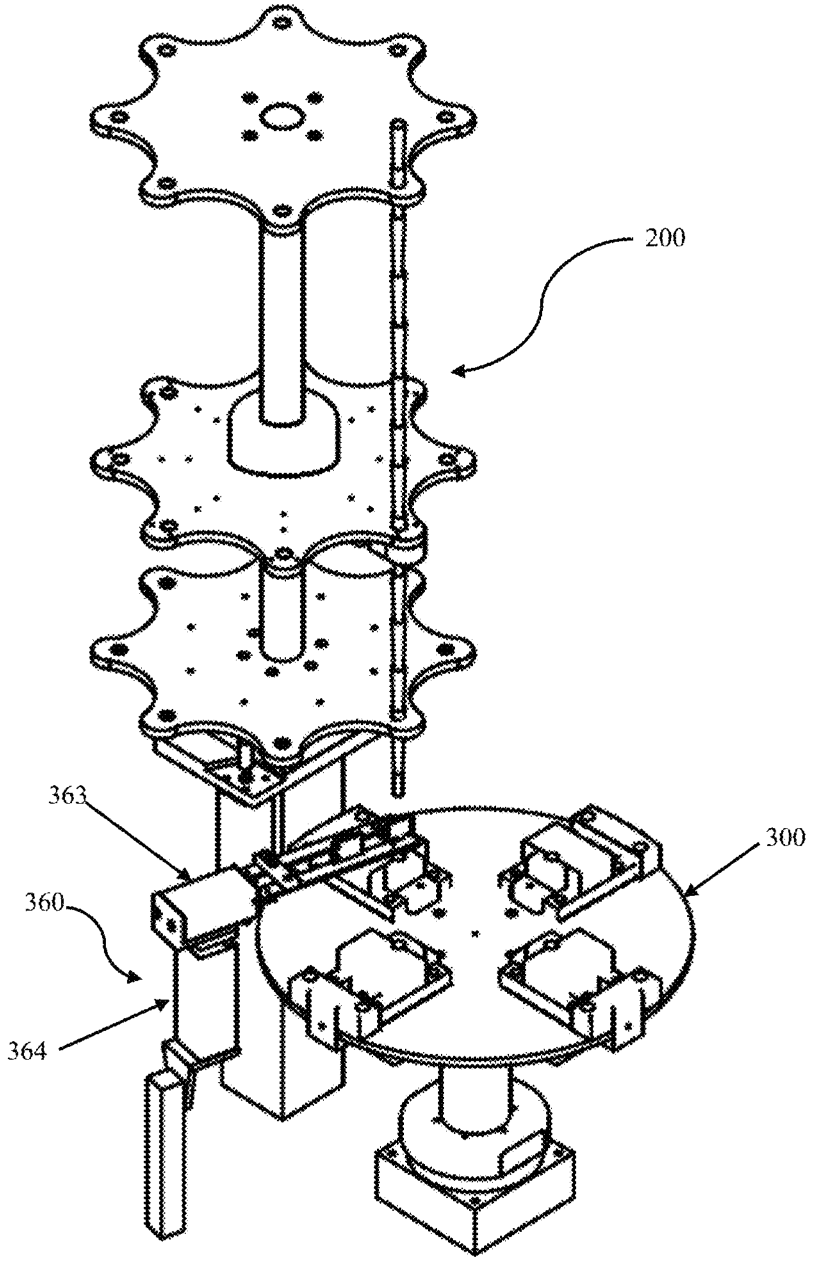
FIG. 3A is a perspective view of an embodiment of the carousel in relation to an embodiment of de-nesting fingers and an embodiment of a cone conveyor.
Figure 3C:
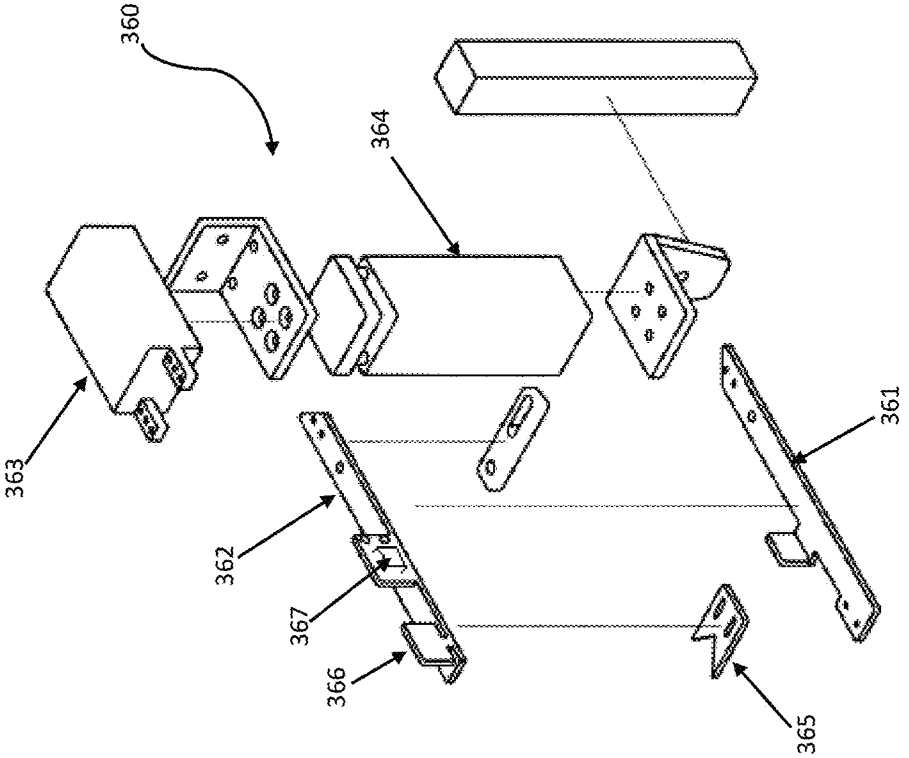
FIG. 3C is an exploded view of an embodiment of de-nesting fingers.
Figure 3B:
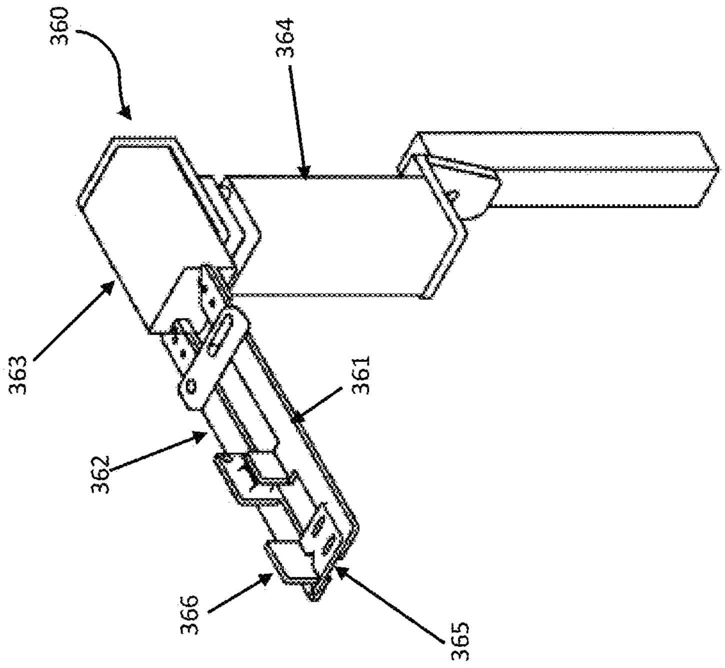
FIG. 3B is a close-up perspective view of an embodiment of de-nesting fingers in a closed position.

FIG. 3A depicts an embodiment of the system including the positioning of the carousel 200, the cone conveyor 300, and de-nesting assembly 360. With reference to FIG. 3B, in one embodiment, the cone may be grasped by de-nesting fingers 361 and 362. One or more of the fingers are moved by a de-nesting actuator 363 to open and close the fingers and are also moved by a vertical actuator 364 to adjust the vertical position of the de-nesting fingers with respect to the cone conveyor 300.

FIG. 3B is a depiction of an embodiment of the de-nesting assembly. De-nesting finger 361 has a notch 365 cut in a distal end of the finger 361. In one embodiment, the notch is V-shaped. De-nesting finger 362 has an approximately vertical plate 366 extending from a distal end of the finger 362. The vertical plate may be flat, curved to match the curve of the paper cone, or angular to approximate a curve. In one embodiment, the vertical plate is T-shaped. The notch 365 and vertical plate 366 are calibrated such that the when the de-nesting fingers come together, the notch and vertical plate sufficiently contact the cone so as to frictionally engage the cone without causing plastic deformation of the cone. The de-nesting actuator 363 brings the de-nesting fingers together to engage the cone, and the vertical actuator 364 moves the de-nesting fingers vertically to extract the cone from the carousel 200. It should be appreciated that while two actuators may be used, a single multi-axis actuator could also be used. The T-shape of the plate on de-nesting finger 362 helps provide additional frictional surface area to help engage the cone and prevent plastic deformation. In some embodiments, the de-nesting fingers may be coated with a frictional material, such as soft rubber or plastic, to increase the friction between the de-nesting fingers and the cone. In an alternate embodiment, the de-nesting fingers may be replaced with a de-nesting suction cup such that the suction cup attaches to the cone by vacuum, the de-nesting assembly pulls the cone down, and then the vacuum is released detaching the suction cup from the de-nested cone.

In one embodiment, vertical actuator 364 moves the de-nesting fingers 361, 362 to extract one cone while the packaging assembly simultaneously activates hole actuator 260 on the second plate to open and allow the stack of cones to move vertically. Once the stack moves sufficiently vertically downward (which can be determined, for example, based on timing or sensor feedback), the hole actuator 260 engages the next cone to support the weight of the stack of cones, and the bottom cone sufficiently engages (such as by friction) the geometric hole 236 to hold the remaining cones.

Thus, as one cone is removed from the bottom of the stack of cones 1100*a*, the hole actuator 260 temporarily releases pressure on the stack of cones and allows the stack to lower by one cone. The hole actuator 260 then reapplies pressure to the stack to prevent more than one cone from exiting through the hole in the lower plate 230. Once all of the cones in one stack are pulled through the hole in the lower plate 230, the rod actuator 250 rotates the plates such that the next stack of cones (not shown) is in position to supply additional cones. In one embodiment, an empty sensor 367 identifies that a cone was not grasped by the de-nesting fingers as the de-nesting fingers come together completely, thus tripping the sensor. Upon receiving a signal from the empty sensor 367, the control system may attempt to grasp a cone again. After one or more failed attempts, the control system may determine that the stack of cones 1100*a* is depleted and send a signal to turn the carousel 200 and orient a new stack of cones over the de-nesting fingers before attempting to again grasp a cone.

Figure 3E:
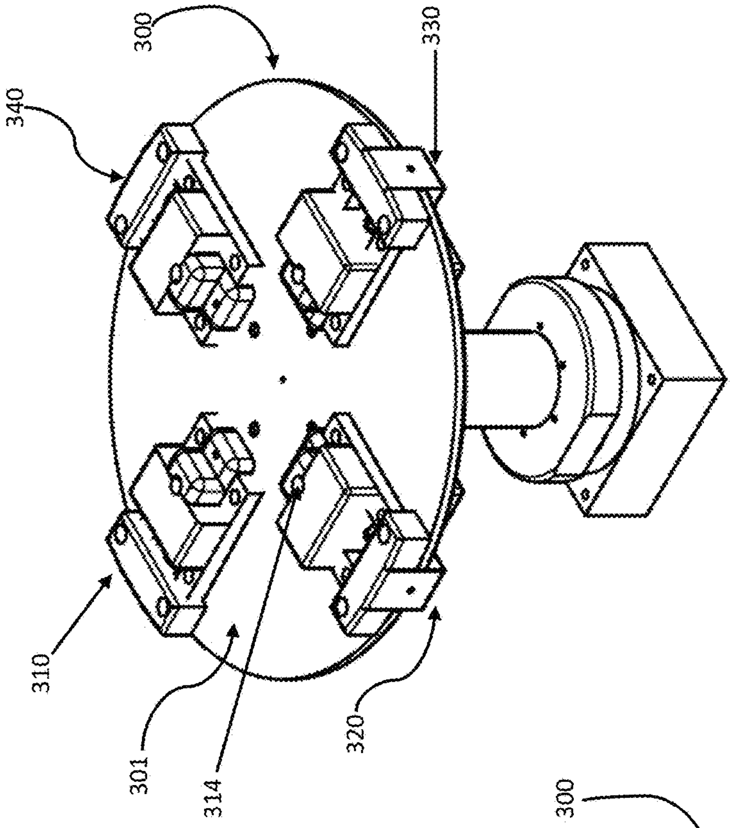
FIG. 3E is a perspective view of embodiments of a cone conveyor and dies.
Figure 3D:
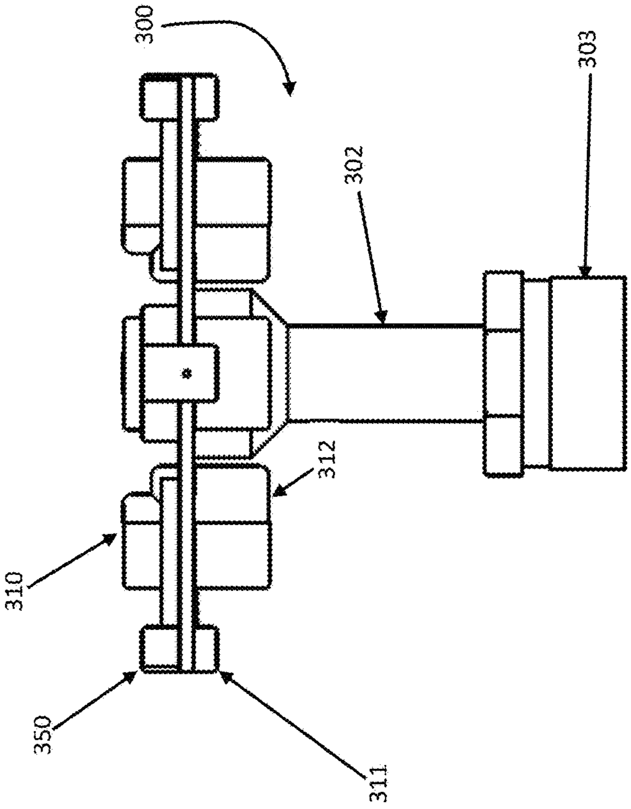
FIG. 3D is a side view of embodiments of a cone conveyor and dies.

The cones are extracted from the cone stack and deposited on the cone conveyor 300. As shown in FIGS. 3D and 3E, the cone conveyor includes a die-plate 301, dies 310, 320, 330, 340 (though it should be appreciated that while four dies are shown, more or less dies could be utilized), a support shaft 302, and a cone conveyor actuator 303. The die-plate 301 is mounted to support shaft 302. The cone conveyor actuator 303 rotates the support shaft and thereby rotates the die-plate 301 to convey the dies (and any cone a die contains) through the packaging assembly. It should be understood that the cone conveyor actuator could be adapted to drive the cone conveyor directly (such as by mounting directly to the die-plate and thereby rotate the die-plate directly). In such an embodiment, the support shaft 302 may be unnecessary. However, in one embodiment, the support shaft may be used to provide separation between the die plate 301 and a mounting surface (such as a bench or table) (see, for example, FIG. 1, table 101). It should be appreciated that a larger cone conveyor with more dies could be utilized, and even a flexible conveyor with many dies.

Figure 3F:
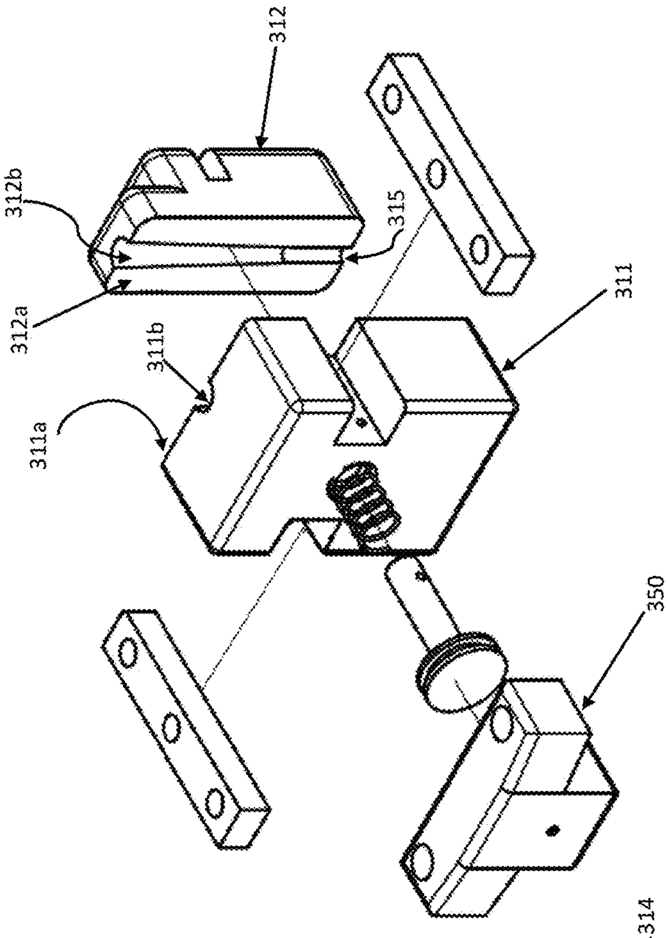
FIG. 3F is an exploded view of an embodiment of a die.
Figure 3G:
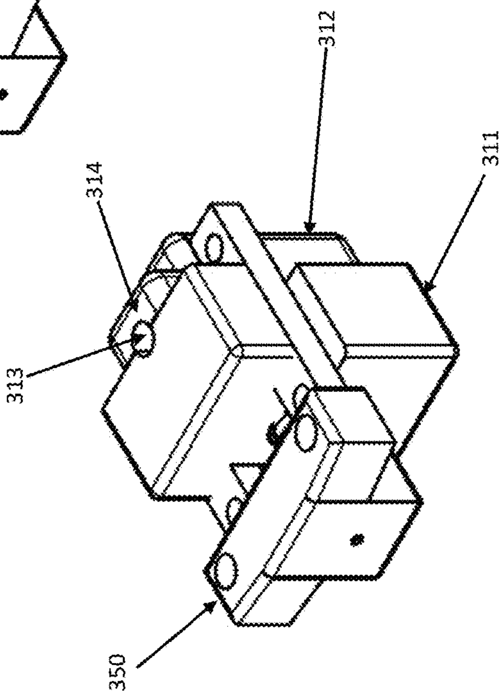
FIG. 3G is a perspective view of an embodiment of a die.

In one embodiment, the cone conveyor 300 may include multiple dies, and preferably includes four dies 310, 320, 330, and 340. The dies may hold a cone to be filled and allows a filled cone to be extracted from the die. For explanatory purposes, an embodiment of a die is shown in FIGS. 3F and 3G. The die may be made of two clamping segments 311 and 312 (though more complex dies made of more clamping segments or an alternative structure could be used). Clamping segment 311 has a contact surface 311*a* and a groove 311*b* while clamping segment 312 has a contact surface 312*a* and groove 312*b*. When brought together, contact surface 311*a* mates with contact surface 312*a*, and the grooves 311*b* and 312*b* of the clamping segments define a cavity (see, generally 313) having a distal end 314 and a proximal end 315 that traverses the vertical thickness of the clamping segments. In some embodiments the vertical thickness of each clamping segment may be the same, but in other embodiments the vertical thickness of one clamping segment (for example 311) may be different than the vertical thickness of the other clamping segment. Preferably, the cavity 313 exhibits the shape of a truncated cone such that the diameter of the cavity is larger at the distal end 314 and tapers toward the proximal end 315. A die actuator 350 moves one or more of the segments to open and close the clamping segments 311, 312, and thereby open and close cone shape cavity 313 allowing a filled cone to be extracted from the die. In operation, de-nesting assembly 360 deposits a cone into cavity 313 of the die 320 and the cone is held by the die. The cone is then filled, and die actuator 350 may then separate the clamping segments 311 and 312 and the cone may pass through the die. That also may prevent the cone from undergoing plastic deformation as could occur if the cone were forcibly removed from the die, such as could happen from gripping the cone.

Figure 4A:
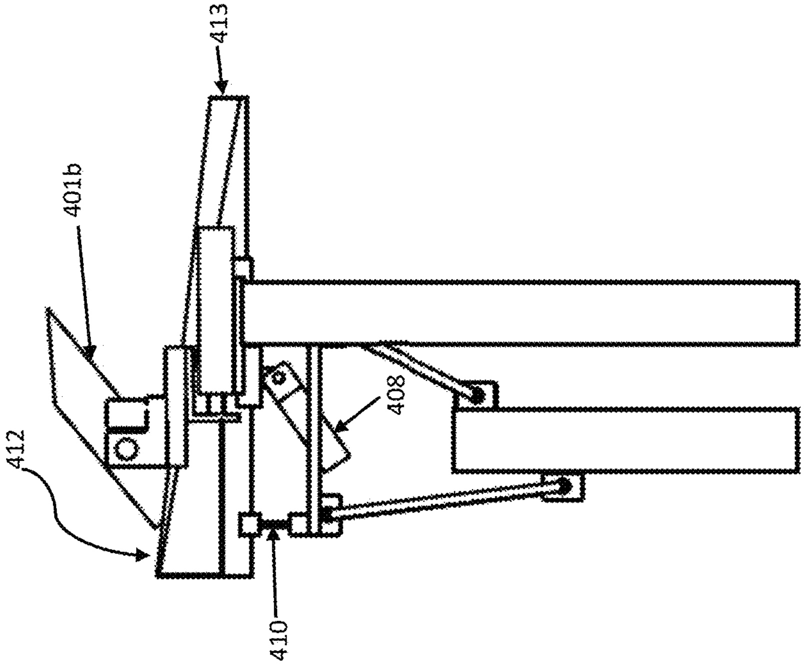
FIG. 4A is a side view of embodiments of a hopper and conveyor.
Figure 4B:
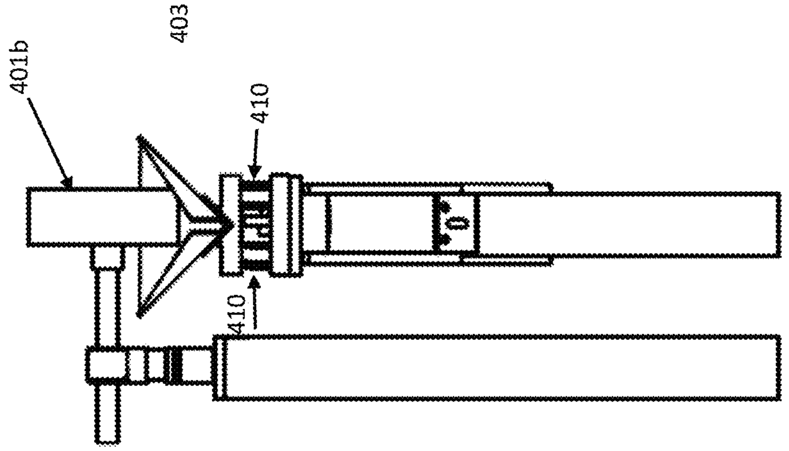
FIG. 4B is an alternative side view of embodiments of a hopper and conveyor.
Figure 4C:
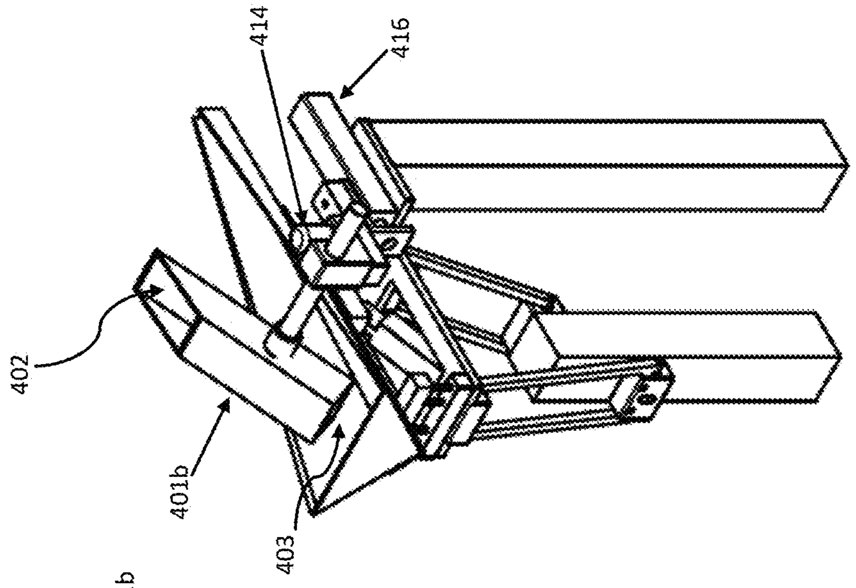
FIG. 4C is a perspective view of embodiments of a hopper and conveyor.

With respect to filling the cone, after the cone is deposited in the die, the cone conveyor rotates and positions the cone beneath a packing station 500 which, in one embodiment is associated with a hopper station 400 (see FIGS. 1A and 1B). In one embodiment, the hopper station includes a conveyor 407. With reference to FIGS. 4A-4D, leaves (not shown) are fed into hopper 401*b*. In one embodiment, as shown in FIG. 4C, the hopper comprises a container that is generally a three-dimensional rectangle with four sides. It should be appreciated that the hopper could be a different shape, such as tubular with uniform, seamless sides. The hopper includes a hopper inlet 402 at the top, through which leaves may be supplied, and a hopper outlet 403 at the base to allow for leaves to exit the hopper. At the base of the hopper is a damper plate 404 that closes the base of the hopper outlet 403 and prevents leaves from exiting. The hopper is preferably mounted proximally to the damper such that when the packaging apparatus is not in operation, there is a gap 405 between the hopper outlet 403 and the damper plate 404. The hopper or damper plate or both may be adjustable to increase or decrease the gap between them depending on the size of the leaves. In one embodiment, the damper plate is connected to the inside of the conveyor 407 and is actuated by leaf conveyor actuator 408 which moves with the conveyor and damper plate relative to the hopper and thereby meters out leaves from the base of the hopper. Alternatively, the damper plate could be mounted directly to an actuator whereby that actuator vibrates the damper plate relative to the hopper and thereby meters out leaves from the base of the hopper. It should be appreciated that the hopper could alternatively or additionally be connected to an actuator to effectuate movement of the position of the hopper relative to the damper. In one embodiment, the damper plate is mounted to the conveyor 407 which is in-turn connected to a leaf conveyor actuator 408 such that one actuator may be used to vibrate both the damper plate 404 and the conveyor 407 simultaneously. In one embodiment, the conveyor 407 is mounted to a base 409 by one or more resilient mountings. For example, resilient mounting springs 410. The resilient material assists in effectuating consistent vibration between the conveyor and hopper. As noted, to assist in the flow of leaves out of the hopper, the damper plate or hopper may be adjustable such that the static distance of the gap between the damper plate and the hopper is variable. For products that have a very fine texture, that static distance may be set very small, but it may be increased when large grain products are being fed.

In one embodiment, the conveyor is substantially V-shaped and forms a channel that moves leaves along the length of the conveyor from a deposit end 412, where leaves are deposited by the hopper to an output end 413, where the leaves are output to the packing station. In one embodiment, the hopper 401 exhibits a tapering shape. For example, where a box-shaped hopper is used, the hopper outlet 403 at the base of the hopper may be approximately 3 inches square while the hopper inlet 402 at the top of the hopper may be approximately 2.5 inches square. That configuration is advantageous because it restricts the incoming flow of leaves and allows the leaves to move from a lower volume space at the top of the hopper to a larger volume space at the base of the hopper. That helps prevent clumping of the leaves in the hopper.

The hopper deposits leaves onto the leaf conveyor 407. In one embodiment the leaf conveyor is constructed of a uniform piece of sheet metal that is bent into a V-shape. While it is conceivable that other materials could be used, the use of sheet metal helps prevent static buildup and thereby assists in consistent conveying of leaves. Forming the conveyor of a uniform sheet of material eliminates seams where leaves could otherwise be caught. The V-shape helps create a uniform line of leaves and thereby maintains a consistent flow of leaves along the conveyor. That assists in reliable filling of the cones later in the process. Additionally, the sides of the conveyor may be wider apart at the deposit end and then narrow as the conveyor approaches the output end. That allows leaves to easily be caught by the conveyor as they exit the hopper at the deposit end and form into a controlled line at the output end of the conveyor.

Additionally, the conveyor is slightly upwardly angled in the conveying direction. That is, as leaves move along the conveyor away from the hopper, the leaves rise. A leaf conveyor actuator 408 is connected to the conveyor. The actuator vibrates the conveyor to cause leaves to move along the length of the conveyor. The combination of the vibrations and the rise in the conveyor assists in creating a uniform line of leaves within the conveyor which leads to more consistent depositing of leaves into the cones.

Figure 4D:
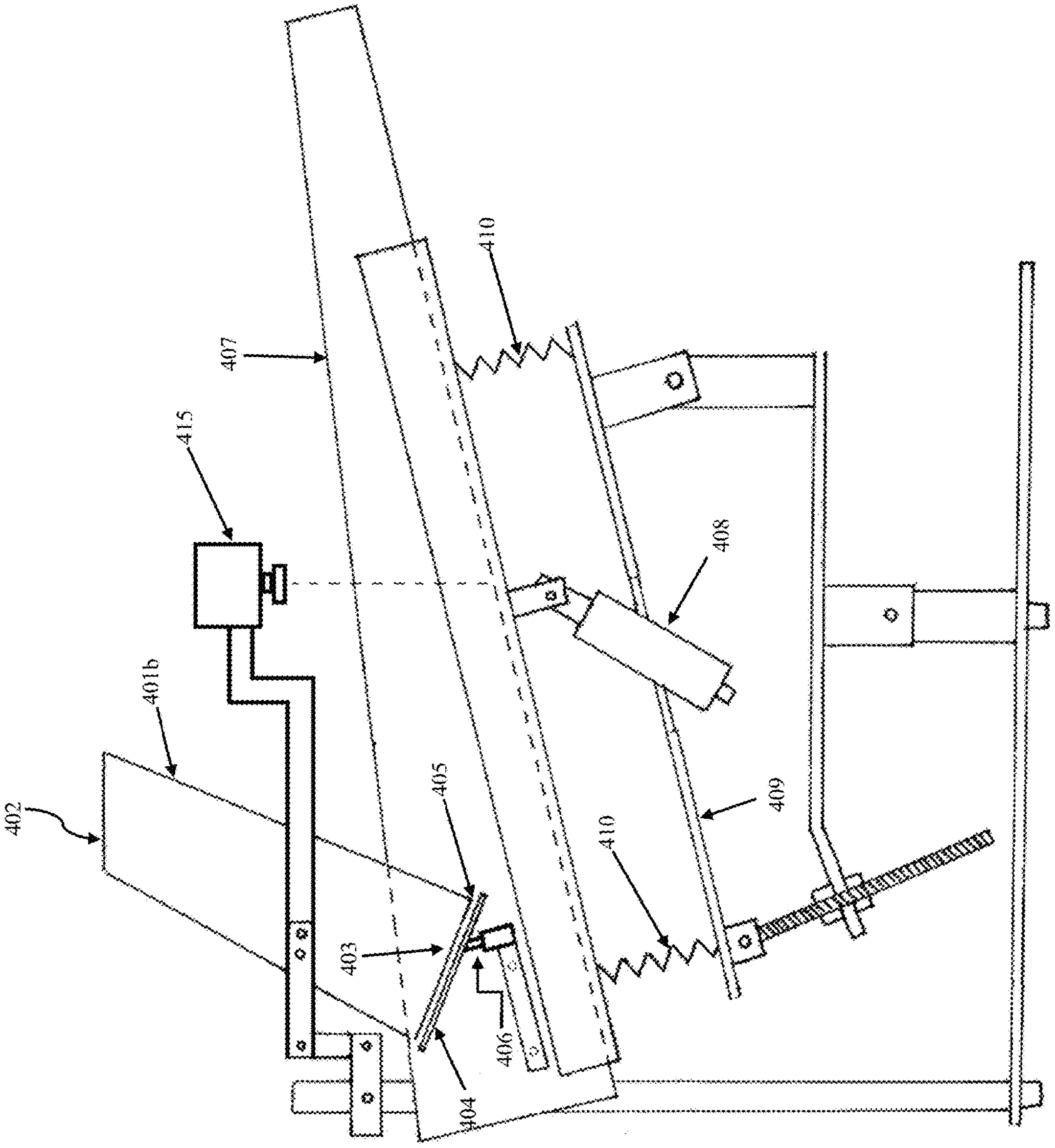
FIG. 4D is a close-up side view of an embodiment of a hopper and conveyor depicting a portion of the hopper within the conveyor along with a damper plate within the conveyor.

In one embodiment, as shown in FIG. 4D, a sensor 415 monitors the level of the leaves moving along the conveyor and provides feedback to the control system (for example via wire relay or wireless communication) to activate an adjustment actuator 416 that adjusts the positioning of the hopper 401 with respect to the damper plate 404 thereby adjusting the gap 405 between the hopper and the plate to permit more or less leaves to exit the hopper. It should be appreciated that the adjustment actuator could adjust the position of the hopper (while the damper plate 404 remains fixed with respect to the conveyor), or the adjustment actuator could adjust the position of the damper plate 404 (while the position of the hopper remains fixed). The sensor may be a photoreceptor that captures data relating to the height of the leaves moving along the conveyor. The sensor relays the data to the control system over a sampling period, for example every 1 second, and the control system determines whether the height of the leaves is within an acceptable range. If it is out of range, for example too high (indicating too many leaves are exiting the hopper), the control system may send a signal to an adjustment actuator causing the adjustment actuator to move and adjust the respective positioning of the hopper 401 and damper plate 404. In one embodiment, the actuator is a linear actuator that moves to slide the hopper closer or further away from the plate. While the increments of movement may vary, for general leaf based products, it has been found that movement of the relative position of the hopper to the damper in 0.1 mm increments tends to result in the optimal adjustment of product flow.

Figure 4F:
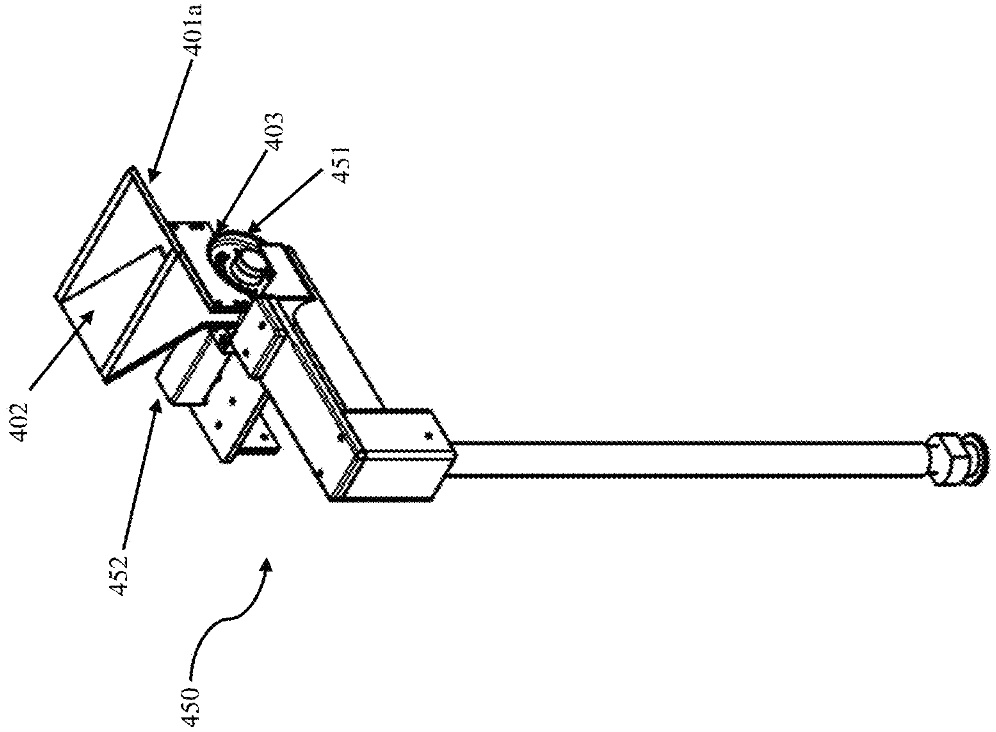
FIG. 4F is an alternative perspective view of an embodiment of a grinder hopper and wheel.
Figure 4E:
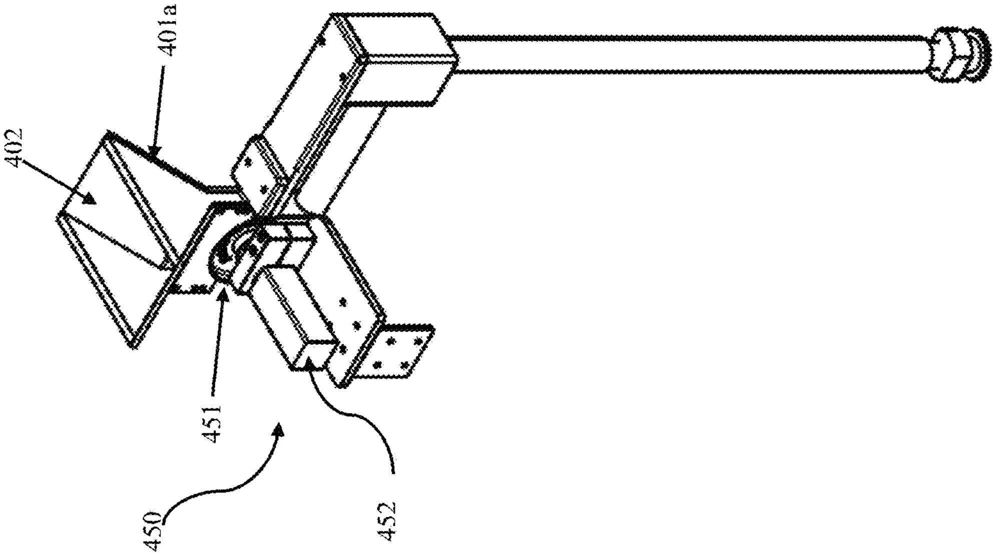
FIG. 4E is a perspective view of an embodiment of a grinder hopper and wheel.

In an alternate embodiment, an alternative hopper may be used in addition to the conveyor 407 or even in place of the conveyor. As shown in FIGS. 4E and 4F, a grinder hopper assembly 450 may be utilized. The grinder hopper assembly 450 includes a hopper 401*a* having a hopper inlet 402 and a hopper outlet 403. At the outlet of the hopper is a wheel 451 that is operated by a wheel actuator 452. The wheel may include a textured surface so as to function as a grinding wheel. In one embodiment, the hopper funnels toward the hopper outlet 403, and the outlet is approximately the same width as the wheel 451. A portion of the wheel fits within the hopper outlet so as to substantially block the flow of leaves out of the hopper while leaving a gap between a surface of the wheel and a portion of the hopper. The control system sends a signal to the wheel actuator to drive the wheel. When leaves are in the hopper, as the wheel spins it draws leaves through the gap between the wheel and the hopper. When a textured wheel is used, the spinning of the textured wheel may grind the leaves as the leaves are forced between the surface of the wheel and the hopper at the hopper outlet. As the leaves exit the outlet, they may be deposited into the conveyor 407, or alternatively deposited directly into a weigh station.

Figure 5A:
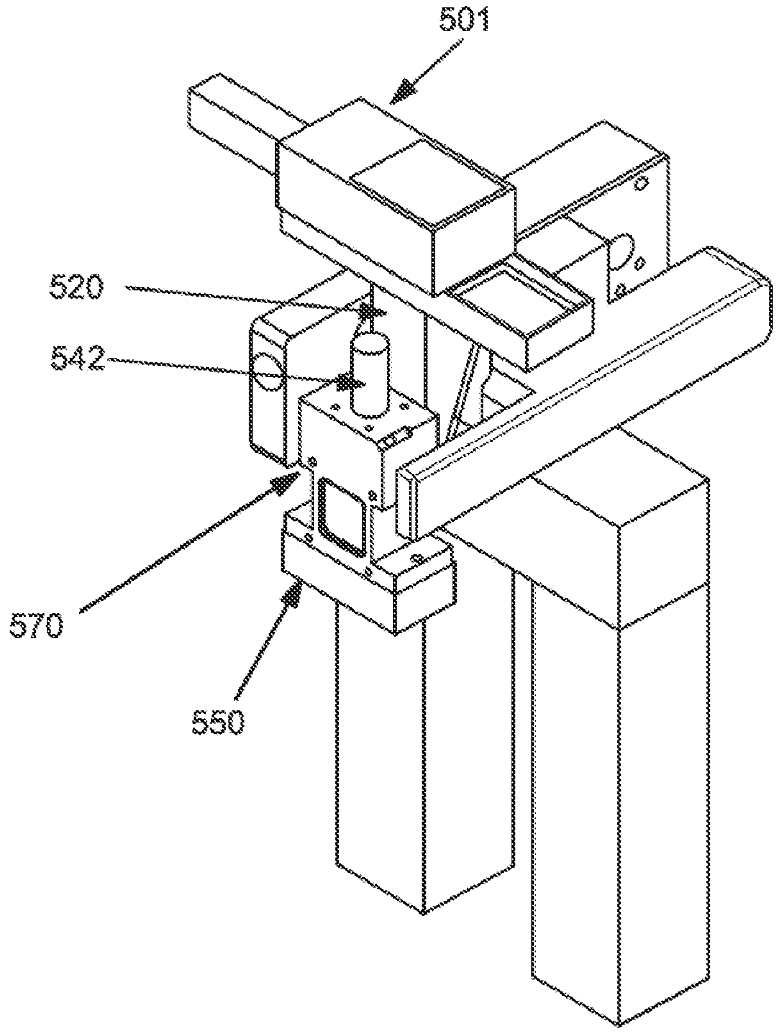
FIG. 5A is a perspective view of an embodiment of a packing station.
Figure 5C:
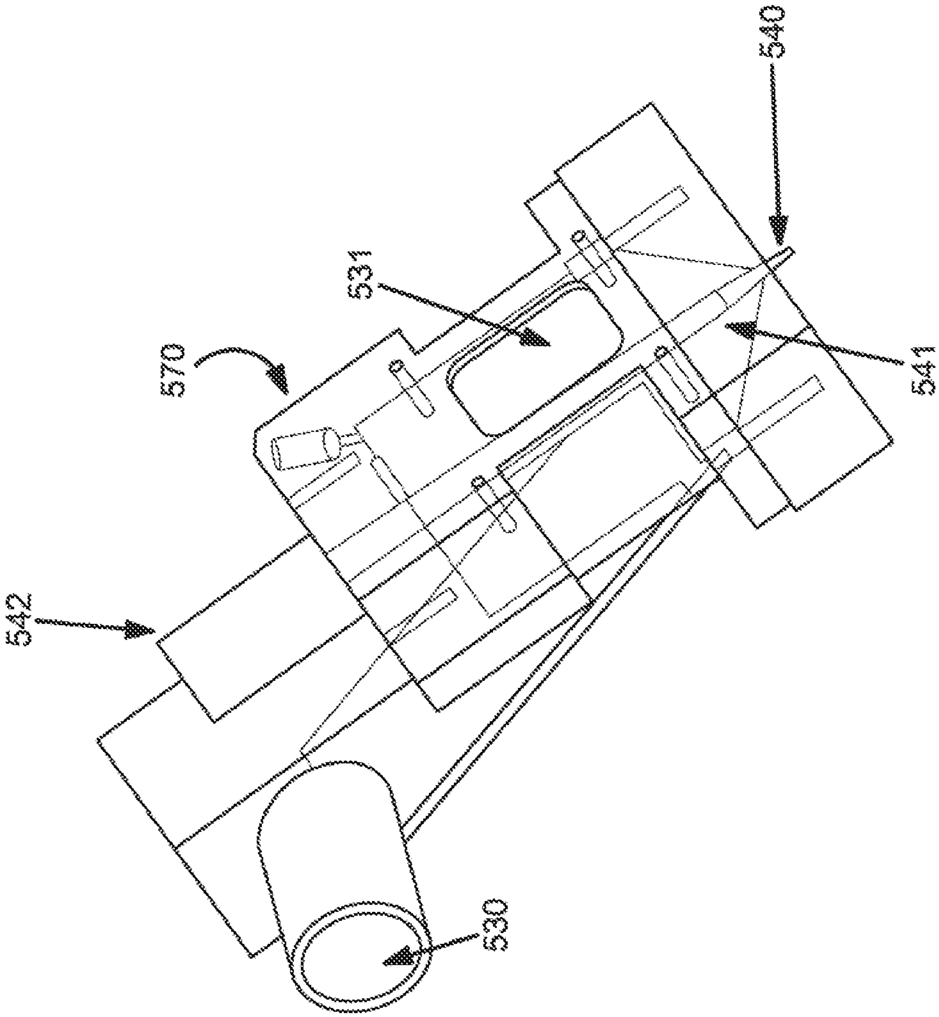
FIG. 5C is an alternative perspective view of an embodiment of a packer head.
Figure 5B:
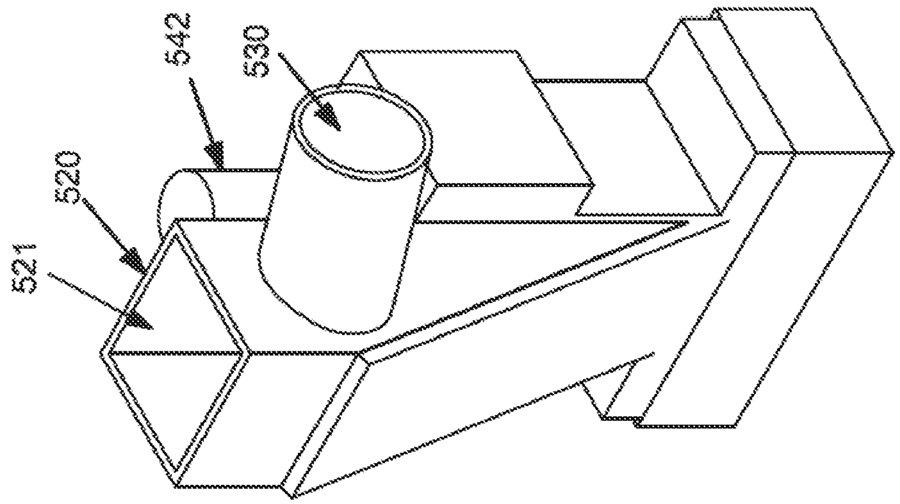
FIG. 5B is a perspective view of an embodiment of a packer head.
Figure 5D:
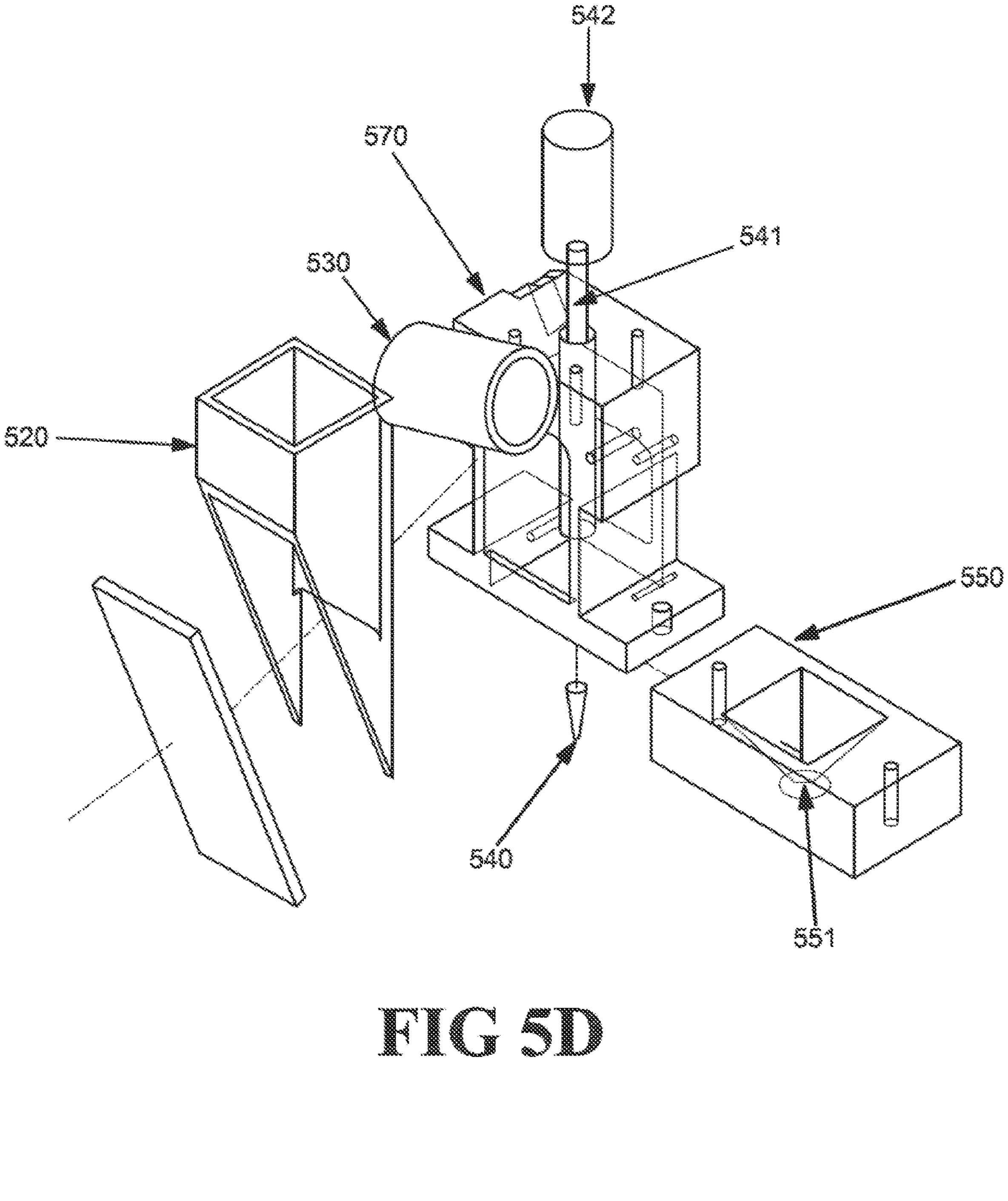
FIG. 5D is an exploded view of an embodiment of a packer head.
Figure 5F:
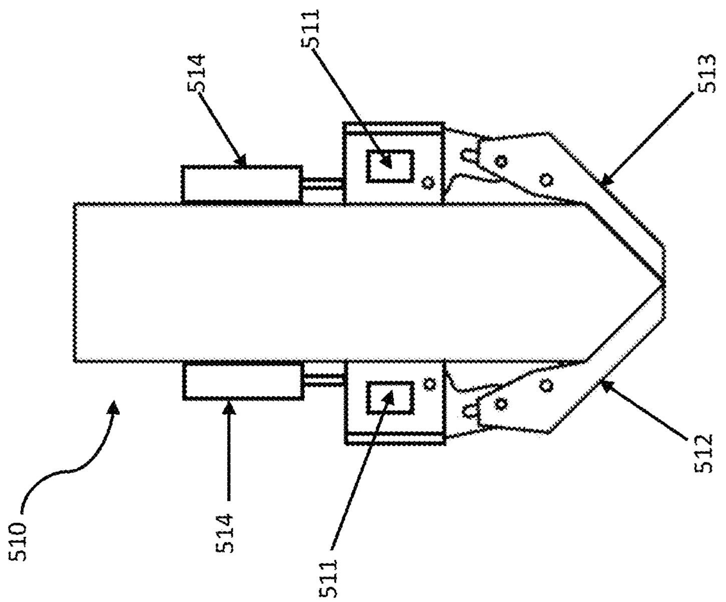
FIG. 5F is an alternative perspective view of an embodiment of a weigh station.
Figure 5E:
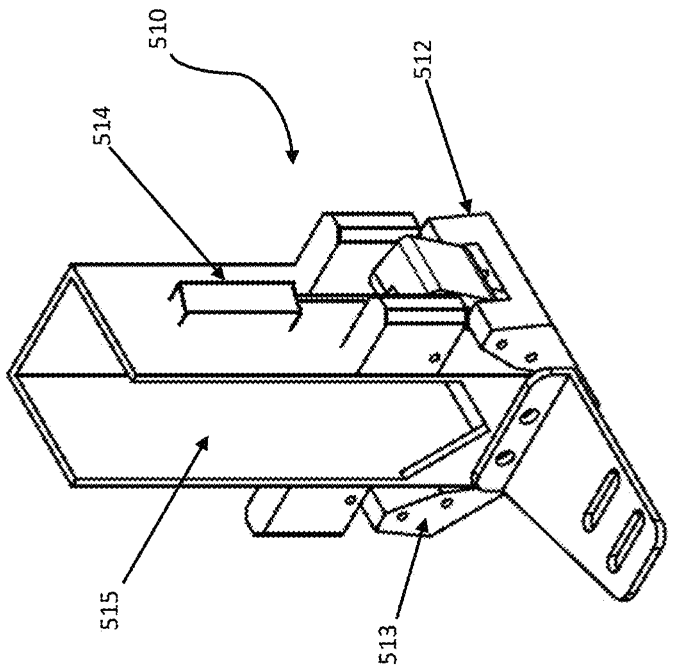
FIG. 5E is a perspective view of an embodiment of a weigh station in a closed position.
Figure 5G:
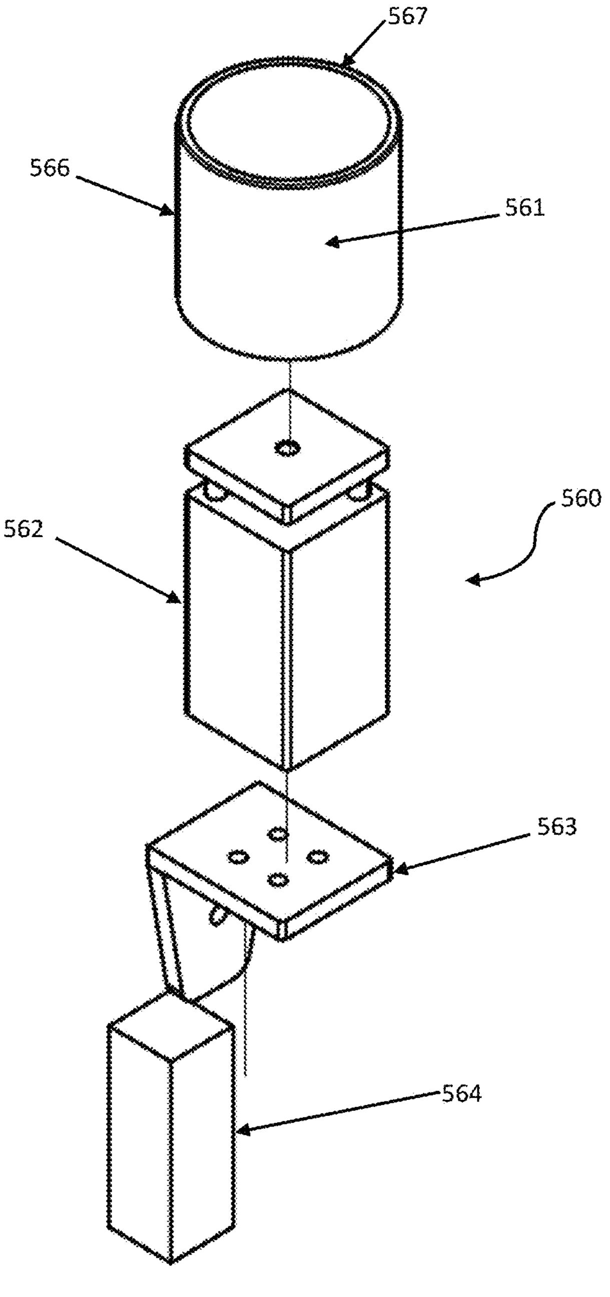
FIG. 5G is an exploded perspective view of an embodiment of a cone support system.
Figure 5I:
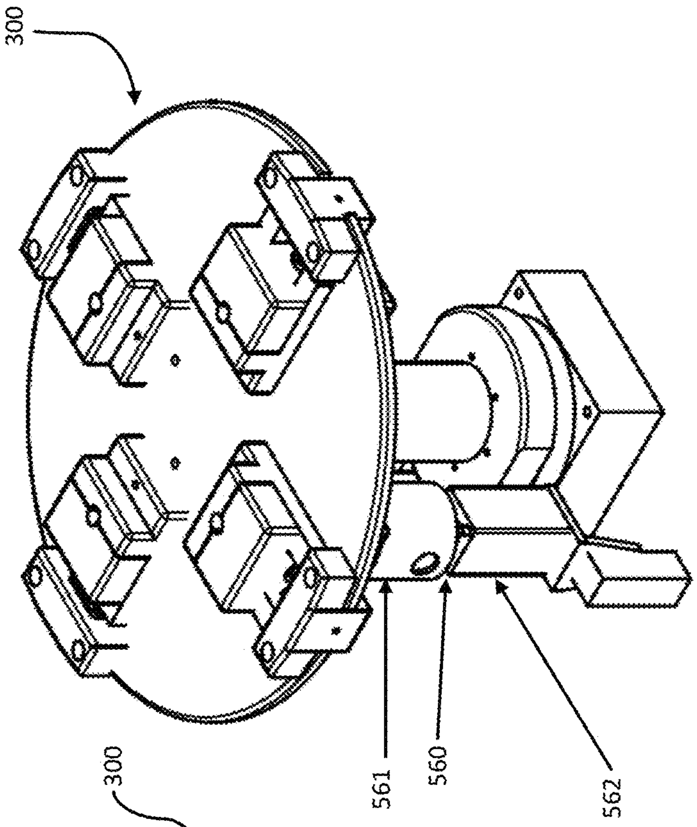
FIG. 5I is a perspective view of an embodiment of a cone support system oriented in relation to an embodiment of a cone conveyor.

With reference to FIGS. 1A-1B and FIGS. 5A-5F, the packing station 500 is associated with a weigh station 510, a chute 520 with chute inlet 521, a chute exhaust port 530, a packer head 570, an outlet funnel 550 with an exit hole 551, and a packing rod 541. In one embodiment, the packing station includes an inlet funnel 501. The conveyor or grinder hopper deposits leaves into the weigh station 510. The weigh station includes a sensor for determining the proper amount of leaves. Any number of sensors could be used, such as optical, sonic, and contact sensors. It should be appreciated that the weigh station need not actually weigh the leaves. In one embodiment, the sensor is a contact sensor that senses the weight of the leaves. As shown in FIGS. 5E and 5F, one or more sensors 511 are associated with the outlet doors 512, 513 at the bottom of the weigh station (though a single outlet door or multiple outlet doors could be utilized). The outlet doors are configured to open and close to allow leaves to build up in the weigh station and then be deposited in the packing station (such as through the chute 520 through chute inlet 521). In one embodiment, one or more sensors 511 send signals to the control station as the leaves are deposited in the weigh station. In an embodiment utilizing the grinder hopper assembly 450, leaves may be deposited directly from the hopper outlet 403 into the weigh station, the weigh station may send signals to the control station indicating the weight of the leaves, and as the weight increases (or at preset weight thresholds stored in the control system) the control system controls wheel actuator 452 to vary the speed of the wheel. For example, as the weight of leaves increases, the control system slows the speed of the wheel to more accurately deposit smaller amounts of leaves to hit a target weight (which may be a preset value stored in the control system). When the proper amount of leaves fill the weigh station, and the control system signals one or more weigh station actuators 514 to open the outlet doors of the weigh station and release the leaves into chute 520. The control system may then increase the speed of the wheel actuator (and wheel) to initially more rapidly fill the weigh station.

One or more actuators open outlet doors 512, 513. The leaves fall down the chute 520 and into the packer head 570 where they are deposited into an outlet funnel 550. The packer head is essentially a cavity that contains leaves from the chute in preparation for filling a cone (though it should be understood that the chute and packer head could be formed together as a unitary structure). In one embodiment, see for example FIG. 1B, the hopper outlet 403 and a portion of the wheel 451 nest inside the weigh station 510 (see nesting cavity 515 in FIG. 5E) so as to limit the possibility of leaves errantly exiting the weigh station and preventing unwanted debris from entering the weigh station.

The chute, packer head, and outlet funnel may be formed separately and connected together (such as by bolts or welding) or may be formed as an integral unit, or a combination thereof. In one embodiment, the chute, packer head, and outlet funnel are sealed together (or formed together) to prevent leaves from spilling out. The packer head and outlet funnel may also be connected to an actuator that moves the packer head and outlet funnel up and down. In operation, the packer head begins in a raised position, a die (for example, 310) holding a cone is moved beneath the packer head, the packer head is then lowered onto the die. In some cases, the top of the cone may protrude from the top of the die. By moving the packer head, the die and cone may be moved into position and the packer head can also move into position and if necessary press the cone into the die all without risk that the cone will be damaged.

Figure 5H:
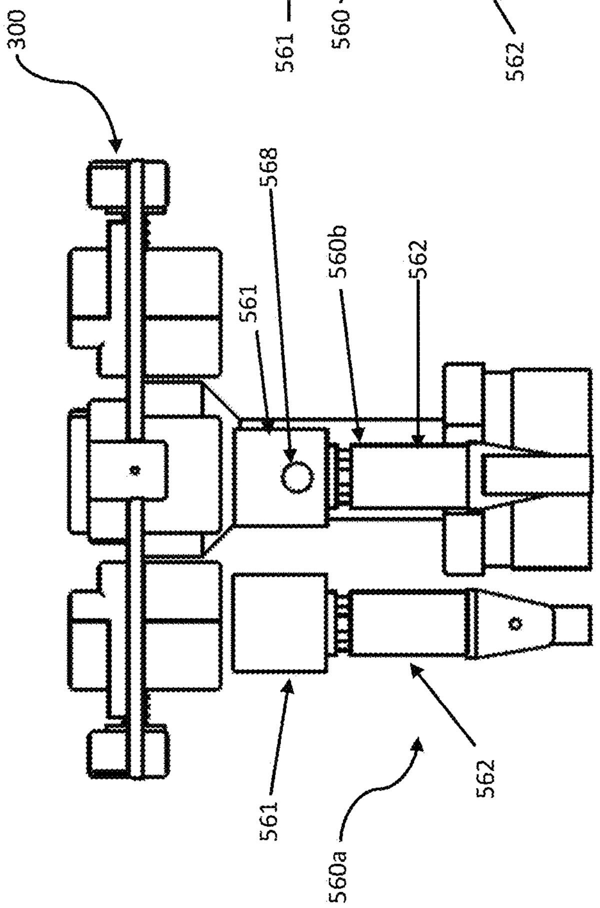
FIG. 5H is a side view of an embodiment of a cone support system oriented in relation to an embodiment of a cone conveyor.

In one embodiment, the packer head 570 and outlet funnel 550 are lowered onto the die to engage the top surface of the die such that leaves are prevented from traversing the junction between the bottom of the outlet funnel and the top of the die. In one embodiment, a cone support system 560 (see FIGS. 5G-5I, and FIG. 6D). In one embodiment, the cone support system includes a cone support 561 that is connected to an support actuator 562. The support actuator 562 may further be connected to a mounting bracket 563 and table mount 564 to fix the cone support system to table 101. The support actuator 562 lifts the cone support 561 such that it may be moved to engage and disengage the proximal end of a cone that is within a die on the cone conveyor. In one embodiment, two cone support systems are provided, such as in FIG. 5H with, for example, cone support system 560*a* being associated with the packing station 500 while cone support system 560*b* is associated with folding station 600.

In one embodiment, the cone support 561 is cup shaped with a cone bottom surface 565 at the base, a raised side wall, a suction rim 567, and an exhaust port 568. The cone support may also include a grate 569 such that when the cone support is lifted to engage with a proximal end of a cone, the grate separates the proximal end of the cone from the bottom surface 565. When the die holding a cone is positioned under the packer head 570, for example, the support actuator 562 moves the cone support 561 such that the contact surface 565 (or grate 569) contacts the proximal end of the cone and adjusts the height of the cone within the die. In one embodiment, a sensor, such as a pressure sensor, is used to determine if the cone is at the proper height by registering resistance of the cone due to the distal end of the cone pressing against the funnel 550. In another embodiment, the height of the cone is a preset value, and the cone support moves to a preset height beneath the packer head 570 to lift the cone to the proper height. The suction rim 567 contacts the bottom of the die holding the cone. A vacuum tube may be connected to the exhaust port 568. With the rim 567 contacting the die, the vacuum may create a suction within the cone support 561 and, with the grate 569 lifting the proximal end of the cone, the vacuum may draw air through the cone to assist with packing of leaves within the cone. The vacuum may also collect leaves that may fail to properly enter the cone or that completely pass thought the cone.

The packer head is essentially an enclosed block (or container) that prevents leaves from escaping the funnel. Referring to FIGS. 5C and 5D, the packer head also helps guide the packing rod 541. The packing rod is connected to a packing rod actuator 542 that moves the packing rod 541 within the packer head 570. Preferably, the packing rod is hollow and connected to a pneumatic system that provides pressurized gas through the packing rod. The packer head 570 may also include an exhaust port 531. Chute exhaust port 530 and exhaust port 531 may be connected to a vacuum system that may selectively turn on and off to clear the chute and packer head of leaves and keep the packing station free from a buildup of leaves.

In one embodiment, as leaves fall through the funnel 550 and out the exit hole 551 in the bottom of the funnel, the leaves are deposited into the cone and a burst of pressurized gas is applied to pack the leaves into the cone. The exit hole may be approximately the same size as the size of the distal end of the cone. Also in one embodiment, the hollow packing rod may be set to a static height, and the pressurized burst function operates the same. The packing rod may be set in a down position such that it closes the hole in the bottom of the packer head. For example, the packing rod has an external circumference that is approximately equal to the circumference of the exit hole 551 such that the packing rod may extend into the exit hole and substantially plug the exit hole. The actuator may slide the packing rod within the packer head and into and out of the exit hole to selectively plug and unplug the exit hole.

Leaves fall into the packer head and the packing rod in the down position prevents the leaves from falling out early. Then a packing rod actuator 542 separates the packing rod 541 from the exit hole 551 in the bottom of the funnel 550. Leaves fall past the tip 540 of the packing rod 541 and through the exit hole 551 into the cone. The tip may be hollow and communicate with the hollow packing rod to allow pressurized gas to flow through the packing rod 541 and tip 540. While the tip may be conical, alternative tips, such as flat, or rounded tips may be used. Successive pressurized bursts of gas are applied and, after each burst additional leaves are permitted to fall past the tip of packing rod such that the pressurized burst pushed the leaves into the cone. The packing rod may be raised and lowered successively such that, when raised, some leaves to enter the cone, then the rod is lowed to stop the flow of leaves while a burst of gas is applied, then the packing rod is raised and the process is repeated.

In one embodiment, the packing rod actuator 542 and packing rod 541 perform that process at least five times while the cone is being filled with leaves. In one embodiment, the pressure of one or more of the bursts of pressurized gas may be varied. For example, the first burst of pressurized gas may be applied at 60 psi, the second at 60 psi, the third at 45 psi, the fourth at 30 psi and the fifth at 30 psi or less. For cones that are approximately 4 cm to 6 cm long, it was found that the preferable range of bursts is between 10 and 15 when utilizing sticky leaves, and optimally 12 bursts, varying the pressure between 60 psi and 30 psi over the course of the application of bursts. Varying the pressure ensures that the leaves are uniformly packed within the cone. It also helps break apart any clumps of leaves that may have persisted from the conveying and weighing process. That too assists in ensuring that the leaves are uniformly packed in the cone.

In embodiments utilizing air burst, the bottom portion of the packing head funnel may be pressed into the top surface of the die so as to create a seal between the packer head and the die. In one embodiment, either the die top or the packer head bottom is equipped with a gasket to facilitate the seal. In operation, the packing rod is inserted into the exit hole of the funnel and may seal the exit hole both to prevent additional leaves from falling through the exit hole and into the cone, and to prevent leaves within the cone from blowing back up through the exit hole when a burst of gas is applied to the cone. In one embodiment, the exterior surface of the packing rod may be resilient and permit elastic deformation of the exterior of the packing rod when inserted through the exit hole to facilitate a seal. In one embodiment the material forming the exit hole may permit elastic deformation of the exit hole when the packing rod is inserted into the exit hole.

Figure 6A:
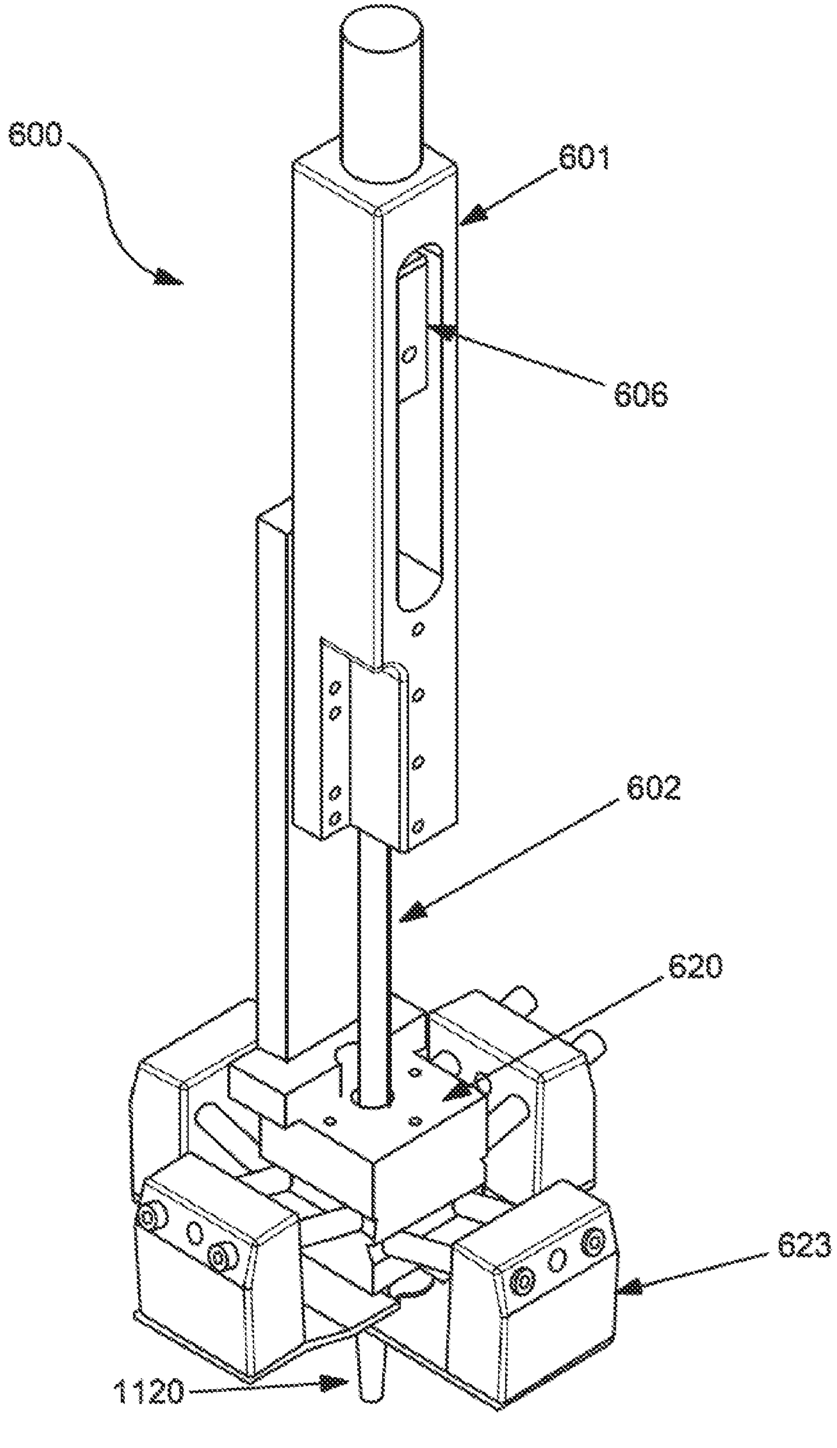
FIG. 6A is a perspective view of an embodiment of a folder station.
Figure 6B:
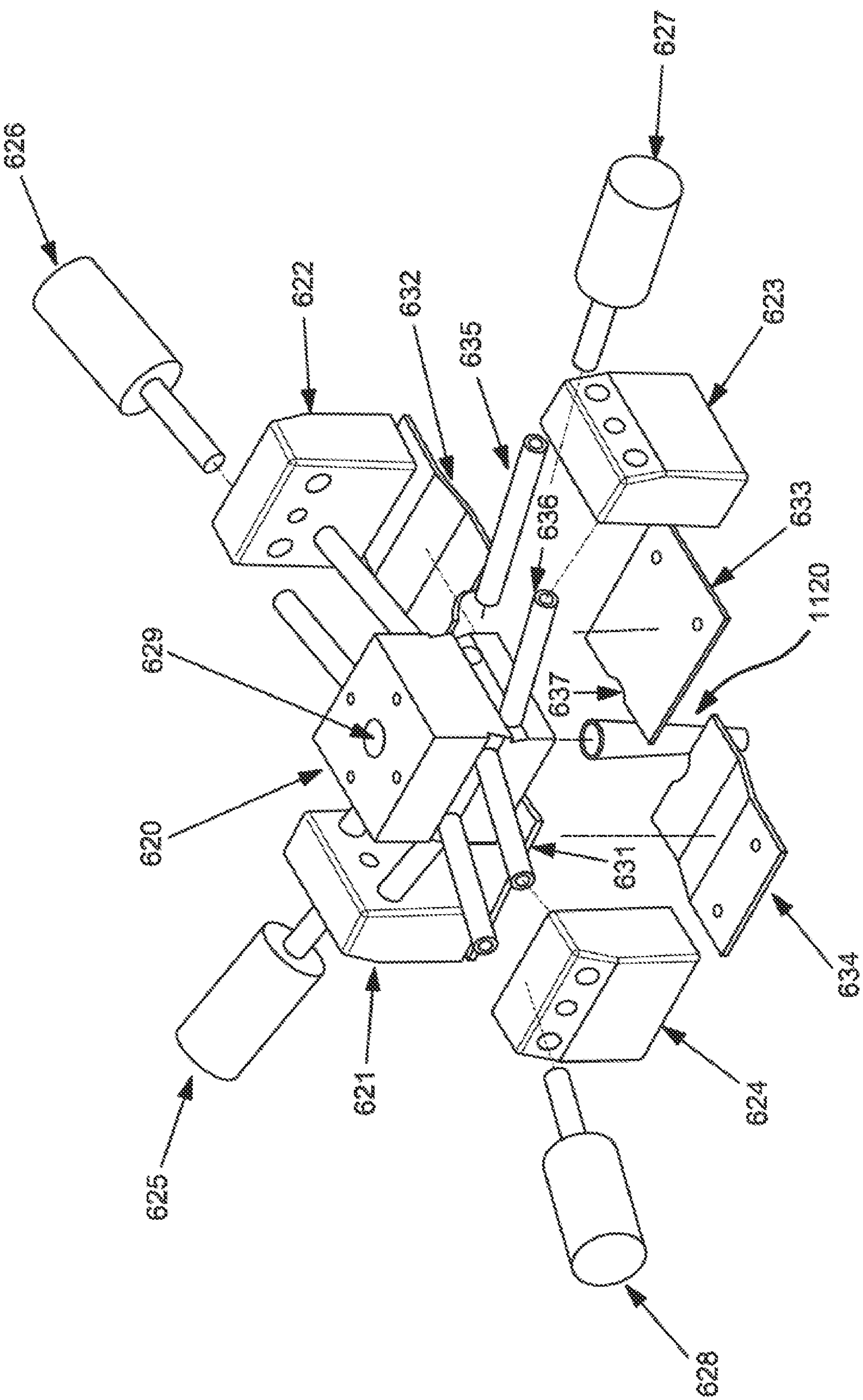
FIG. 6B is an exploded view of an embodiment of folder fingers.
Figure 6C:
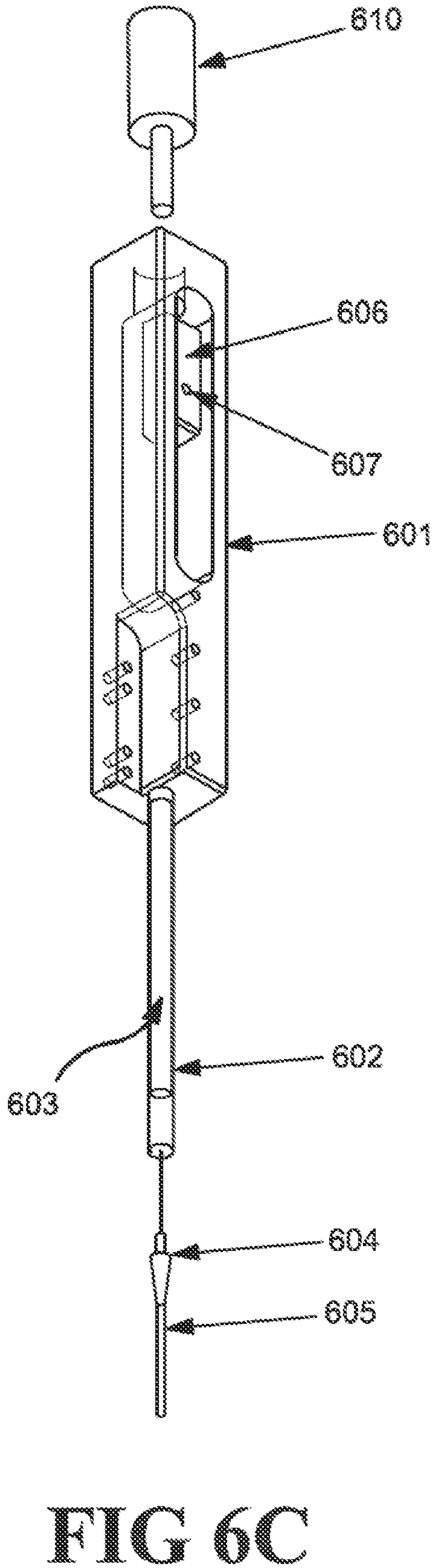
FIG. 6C is a partially exploded perspective view of an embodiment of a portion of a folder station including an injector needle.
Figure 6D:
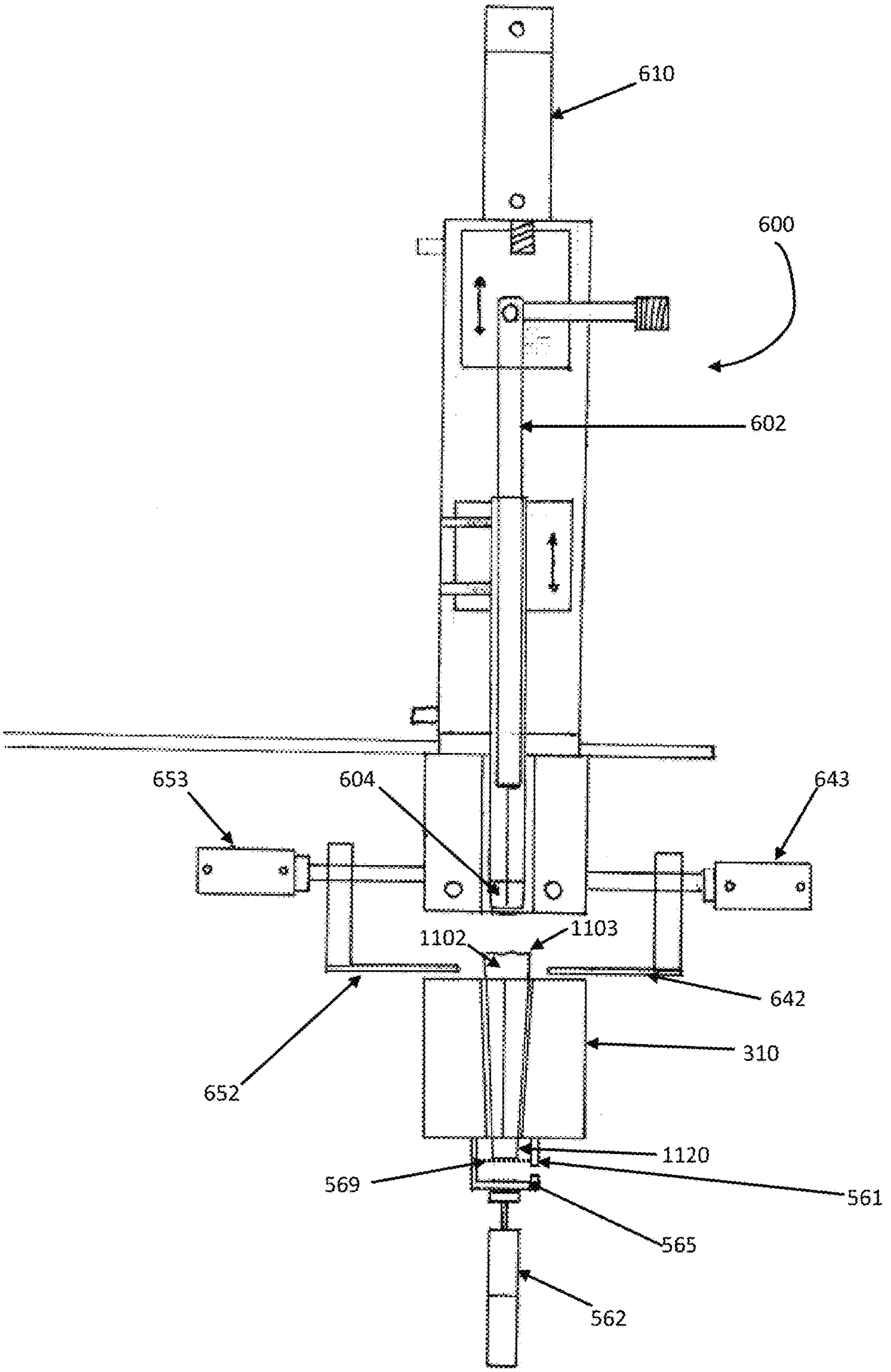
FIG. 6D is a cross-sectional side view of an embodiment of a folder station including an injector needle with an unfolded cone.

After the cone is packed at the packing station, the cone may be moved to the folder station 600. With reference to FIGS. 6A-6P, the cone conveyor 300 rotates and thereby moves a die from the packing station 500 to the folder station 600. The folder station includes a housing 601 that accommodates a folding rod 602. In one embodiment, the folding rod 602 is hollow and it guides an inner tube (or rod) 603 arranged within folding rod 602. A folder tip 604 is affixed to (or integrated with) a distal end of the folding rod 602, while a proximal end of the folding rod 602 is associated with a folding rod actuator 610. In one embodiment, an injector needle 605 may be arranged coaxially with the folder tip 604 such that it may extend and retract from the folder tip 604. In one embodiment, the inner tube 603 is connected at a distal end to the injector needle 605 (or the distal end of the inner tube may be integrated with the injector needle) and the proximal end is connected to a fluid transfer block 606 which is in turn connected to a fluid reservoir (not shown). The fluid transfer block 606 is connected to the injector needle 605 by an inner tube 603 and may include a fluid hole 607 that communicates with a fluid pathway (not shown) so as to allow fluid to flow from the fluid pathway into the fluid transfer block (and hence into the inner tube and injector needle) when the pathway and fluid hole are aligned, but also allow the fluid transfer block to slide within the housing. The fluid transfer block 606 may be located within the housing and include an actuator (not shown) that pumps fluid from the fluid reservoir through the inner tube 603 and out the needle 605, and may also extend and retract the needle 605 (alternatively an additional actuator could be used to extend and retract the needle). For example, a pneumatic piston may be activated to apply pressure to the fluid transfer block and thereby force the fluid transfer block to pump fluid through the needle. That allows a variable pressure to be applied to the fluid transfer block, and by extension the fluid may be readily pumped out of the needle at a variable pressure.

The folder station 600 may further include a folding block 620. In one embodiment, as shown in FIGS. 6A-6B, the folding block includes four support structures 621, 622, 623, and 624 each associated with a folding finger actuator 625, 626, 627, and 628, respectively, but it is conceivable that more or less support structures could be used. Each support structure is connected to (or integrated with) a folding finger 631, 632, 633, and 634. The connection could be accomplished through fasteners, such as screws or rivets, or the connection could be made by welding. Alternately the support structure and finger could be integrally formed such that the support structure and finger are connected into single unitary piece. The support structures surround the folding block 620 having a cavity 629 extending vertically through it such that the cavity accommodates the folding tip and folding rod.

In one embodiment, the support structures are mounted to the folding block by one or more guide posts. In one embodiment, each support structure is mounted using two guide posts. For example, support structure 623 is mounted by guide posts 635 and 636. The folding finger actuators 625, 626, 627, and 628 move the support structures and fingers along the guide posts. It is conceivable that the guide posts could be eliminated and the actuators could be solely responsible for guiding the support structures.

In one embodiment, each folding finger has a distal edge with a recess formed in the distal edge. For example, folding finger 633 includes recess 637. When the folding finger actuators move the support structures close to the folding block 620, the folding fingers are moved closer to one another and the recess of each finger engage the top portion of the cone and cause the top of the cone to deform. That pre-folds the distal end of the cone. Preferably, the fingers are offset such that they slide over one another such that the recesses of opposing fingers (i.e. fingers 633 and 631) are aligned when the fingers come together. One or more of the folding finger actuators may be actuated to move the folding fingers together and apart from one another. In one embodiment, the support structures are of approximately the same size and the guide posts are offset to ensure proper offset of the fingers. However, it is conceivable that the support structures could be made of different sizes or the mounting location could be altered to ensure the proper offset.

In one embodiment, only two folding fingers are utilized. With reference to FIGS. 6I-6J, one embodiment includes folding block 620, support structures 641, 651, folding fingers 642, 652, and folding finger actuators 643, 653. The folding fingers each include a recess 644, 654. In a further embodiment, recesses 644 and 654 are substantially V-shaped. For example, the recess 644 has a first side wall 660 and a second side wall 661 that converge at a vertex 662. In one embodiment, rather than the sidewalls converging at a sharp, angular vertex to form the V, the walls converge at a concavity, such that the walls of recess 654 converge at concavity 655, and the walls of recess 644 converge at concavity 645. Preferably, each concavity is semicircular. The concavity ensures that when finger 642 and finger 652 come together (for example finger 642 is positioned to slide over finger 652 such that recess 644 partially eclipses recess 654) a fold hole 663 remains between finger 642 and finger 652. The fold hole 663 may accommodate a portion of the cone. Preferably, the hole is approximately 0.125 inches in diameter. The combination of the V-shaped recesses and the hole ensures that each cone pre-folds together in substantially the same manner. The preferred diameter of the hole keeps the pre-folded cone packed tightly together and enhances the uniformity of the button fold made by the folding tip.

Figure 6E:
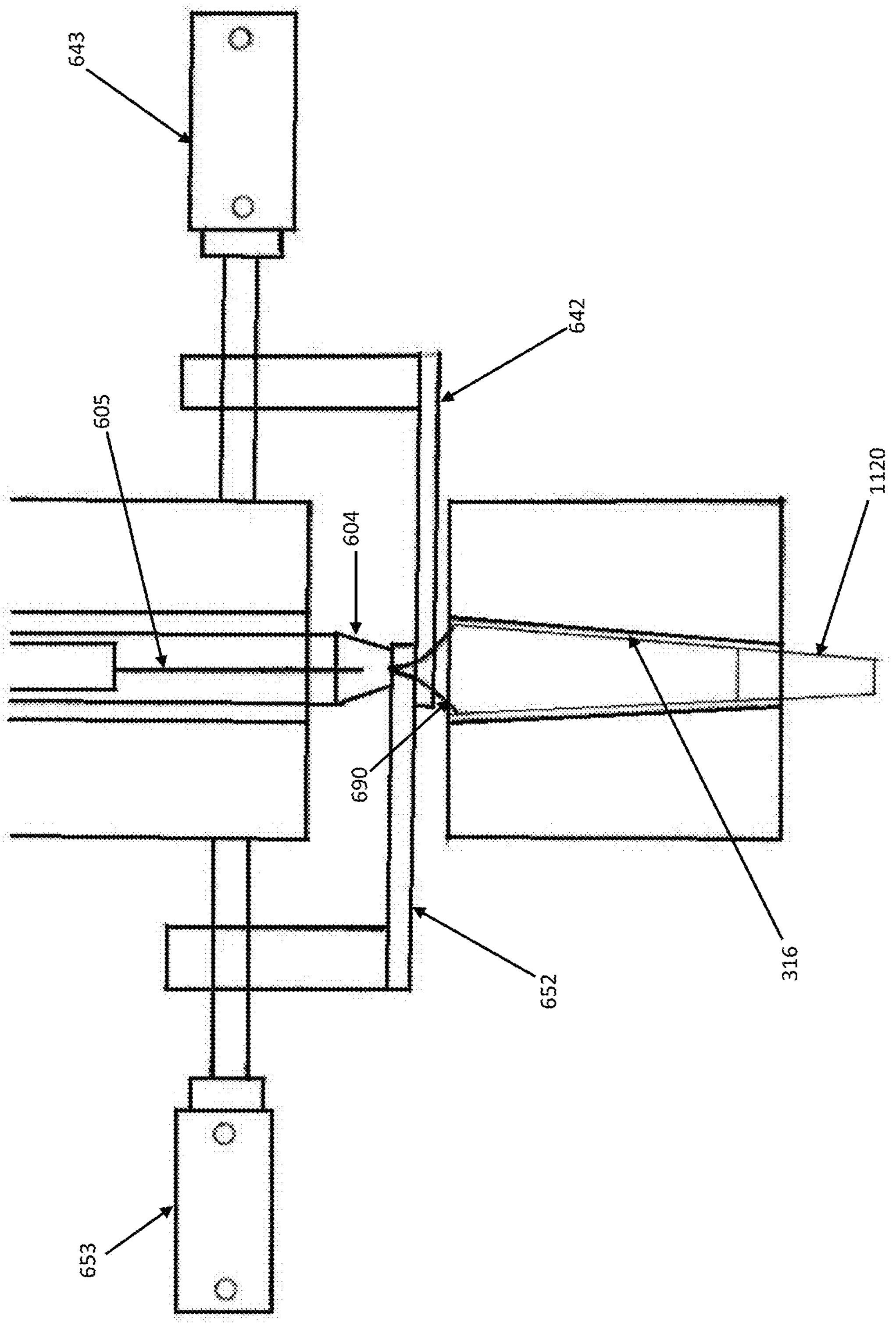
FIG. 6E is a cross-sectional side view of an embodiment of a folder station including an injector needle with a partially folded cone.

With reference to FIGS. 6D-6G, (which depict an embodiment of the folding station executing an example of a folding process and fluid injecting process) in one embodiment, a die 310, containing filled cone 1120 is moved below the folding station 600. In one embodiment, a cone support 561 supports the proximal end of filled cone 1120. The cone support may be integrated with or connected to support actuator 562 that retracts when the cone conveyor 300 is rotating, and raises to contact (and in some embodiments lift) the filled cone 1120 when the cone conveyor is stationary. The lifting and retracting of the filled cone 1120 can assist in ensuring that the distal end of the cone 1102 protrudes from the die 310 for proper folding, but allows the distal end of the cone to be below the folding fingers when the cone conveyor is rotating. In one embodiment, the cone support may attach to the cone (such as through suction or mechanical clamping). Folding finger actuators 643, 653 push the support structures toward the folding block 620 and the recess of each finger engage the distal end of the filled cone 1120 and cause the distal end of the cone to deform (see generally 690) and pre-fold the cone, folding rod actuator 610 causes the folding tip 604 to contact the pre-folded top of the cone as shown in FIG. 6E. In one embodiment the top of the cone is partially drawn down through the recesses of the fingers as the fingers close and deform the top of the cone. For example, the cone support attaches to the proximal end of the cone by vacuum, and the support actuator 562 retracts to draw the cone down. Drawing the cone through the fingers creases the paper to enhance the pre-fold of the top of the cone. The folder tip 604 is lowered onto the pre-folded cone. The fingers are retracted as the folding tip is pressed into the distal end of the cone. That presses the filled cone 1120 into the die 310 and completes the fold. In one embodiment, the pressure of the folding tip on the cone creates a button fold.

With reference to FIGS. 6I, and 6L-6P, there is depicted an embodiment of a folder tip 670 and a both a perspective view of a filled, folded cone and a cross-sectional view of a distal end of a filled, folded cone 1120. In one embodiment, the fold hole 663 is approximately the same shape and size as an axial pin 671 of a folding tip 670, such that the fingers 652, 642 may come together and press the paper of the cone against the axial pin 671. As the folding tip 670 presses into the distal end of the filled cone 1120, the axial pin 671 prevents the cone from fully enclosing the distal end, and when the folding tip is retracted, an access hole 1122 is formed in the folded paper 1121 of the filled cone 1120.

Figure 6F:
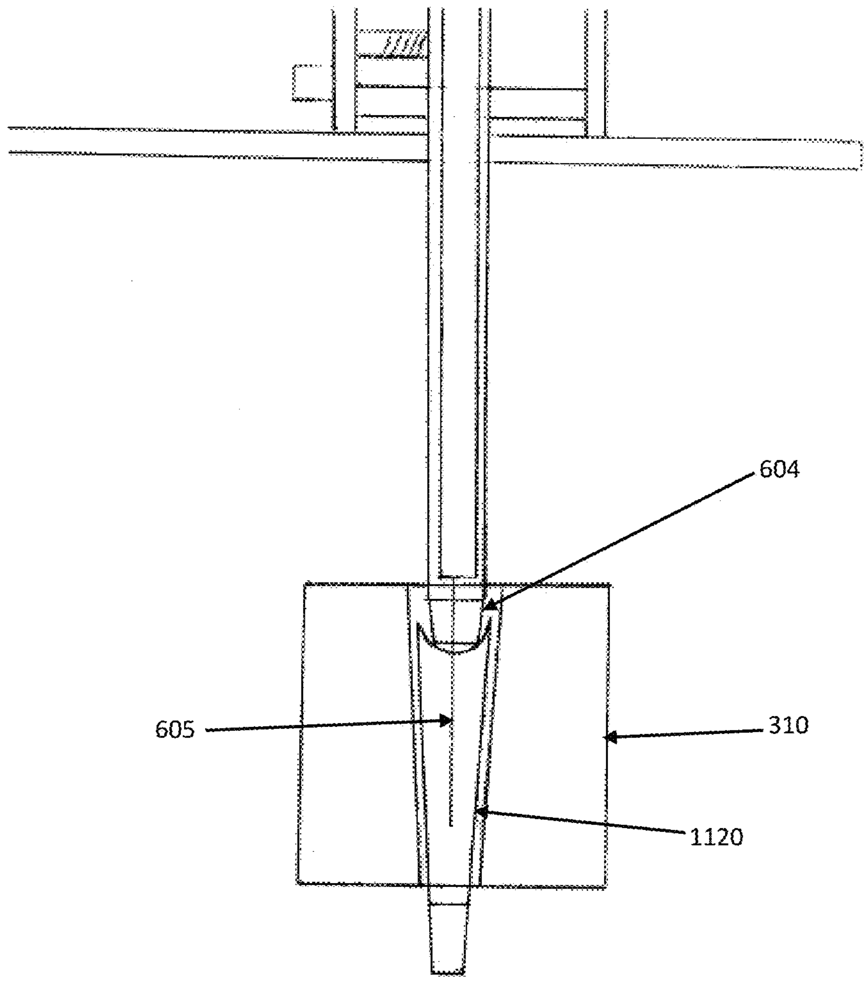
FIG. 6F is a cross-sectional view of an embodiment of a folder station with injector needle inserted into a cone.
Figure 6G:
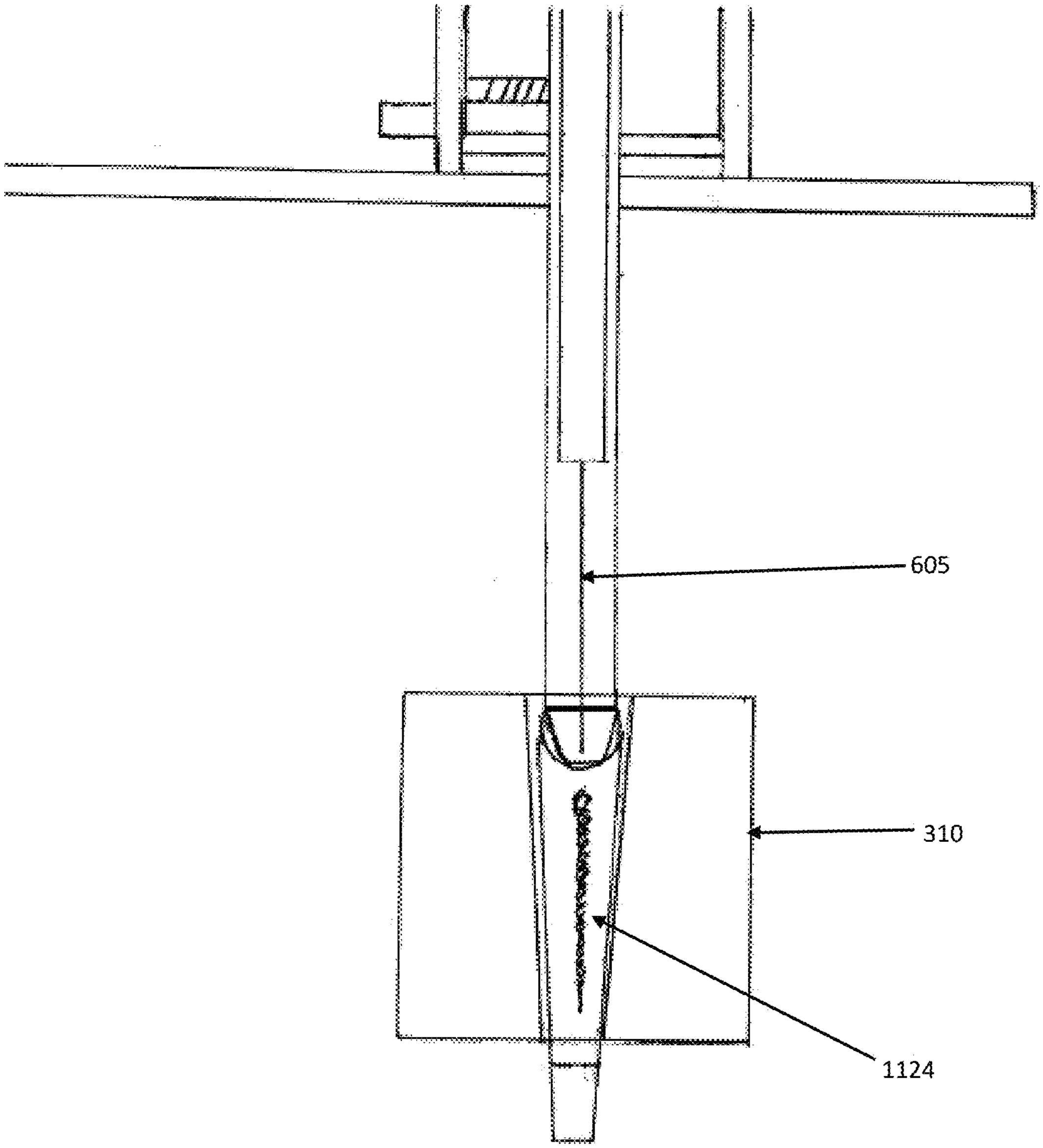
FIG. 6G is a cross-sectional view of an embodiment of a folder station with injector needle extracted from a cone and a cone having a fluid core.
Figure 6I:
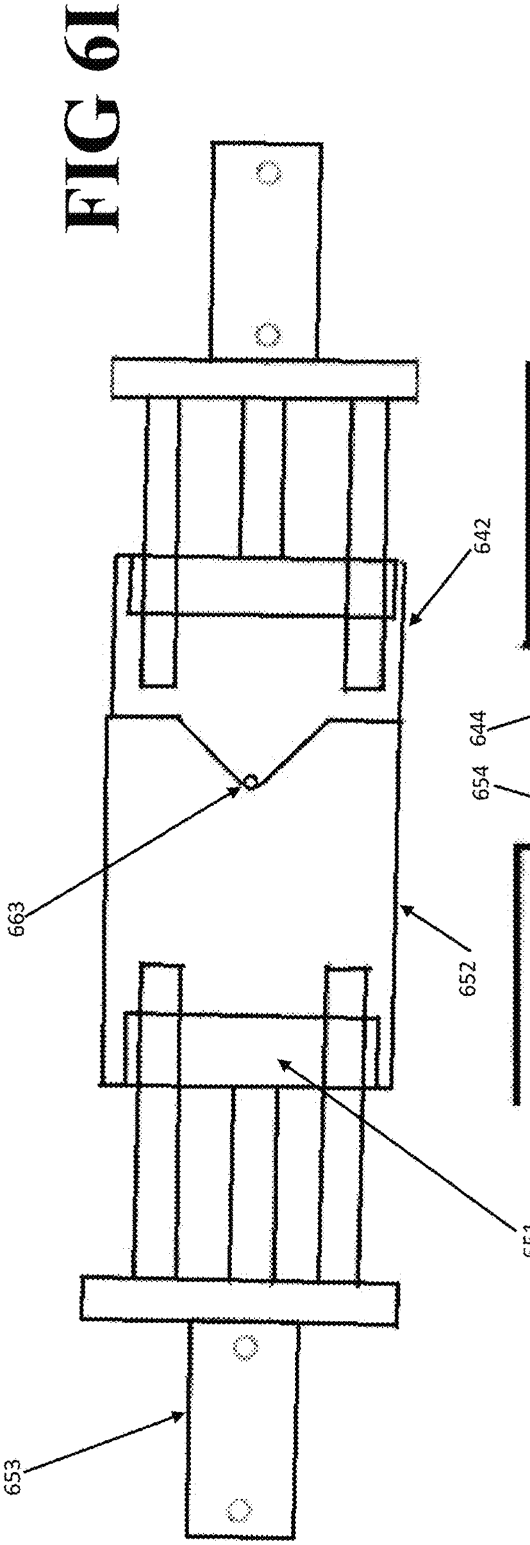
FIG. 6I is a close-up plan view of an embodiment of folder fingers in a closed state.
Figure 6H:
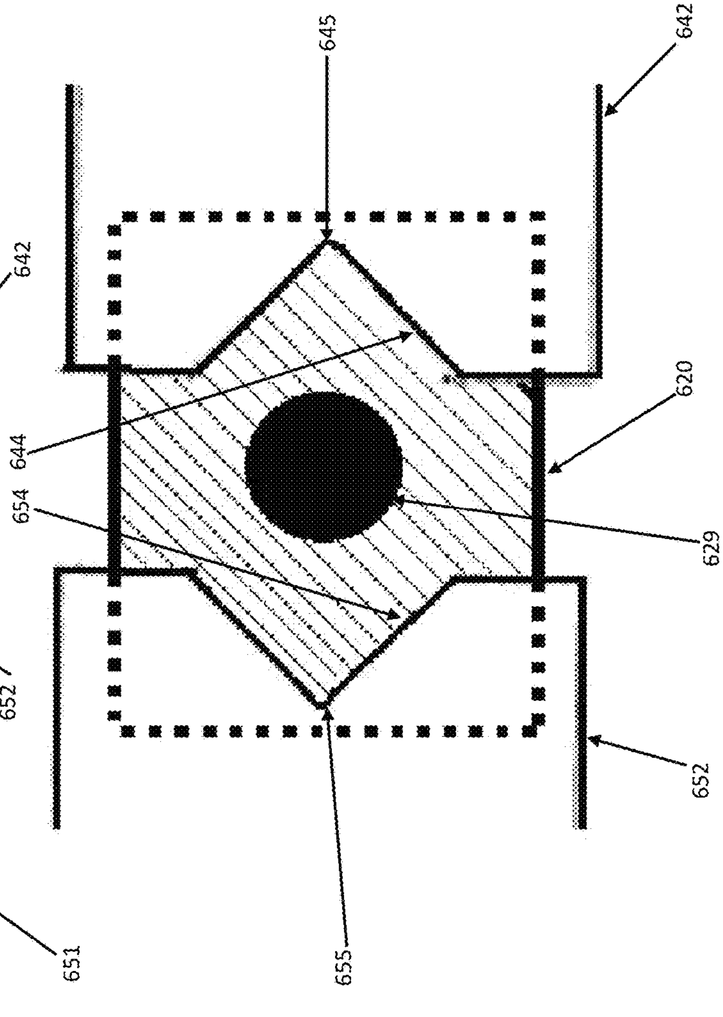
FIG. 6H is a close-up plan view of an embodiment of folder fingers in a partially closed state.
Figure 6K:
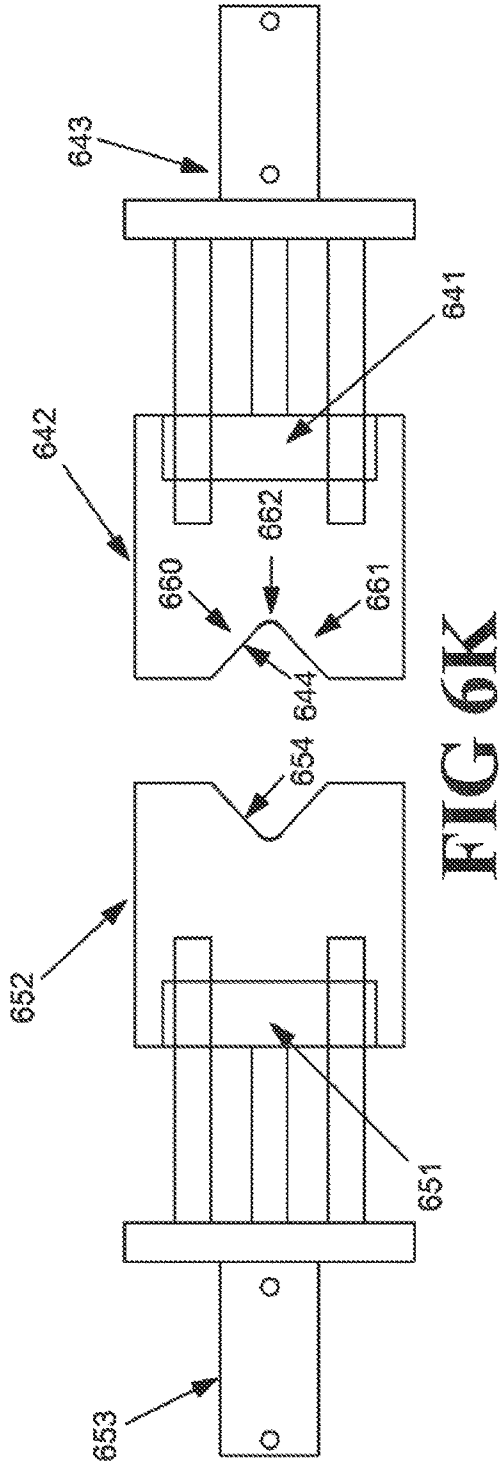
FIG. 6K is a plan view of an embodiment of folder fingers in an open state.
Figure 6J:
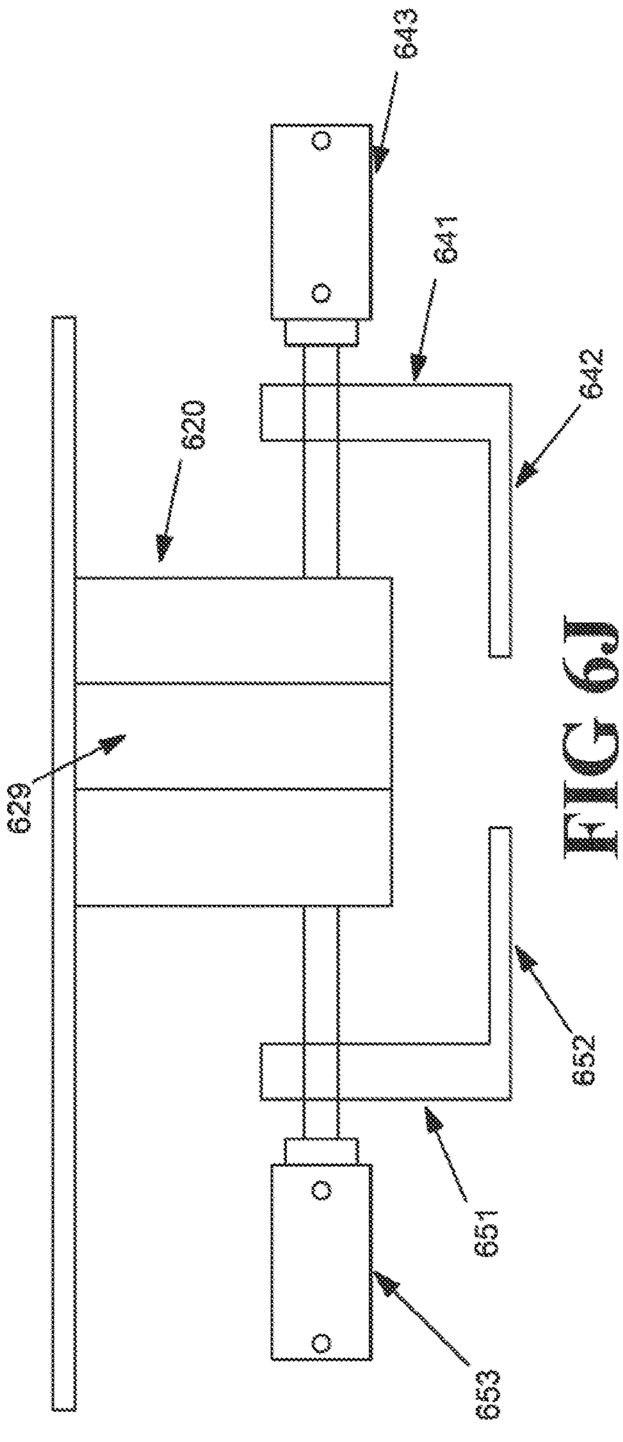
FIG. 6J is a side view of an embodiment of folder fingers in an open state.
Figure 6P:
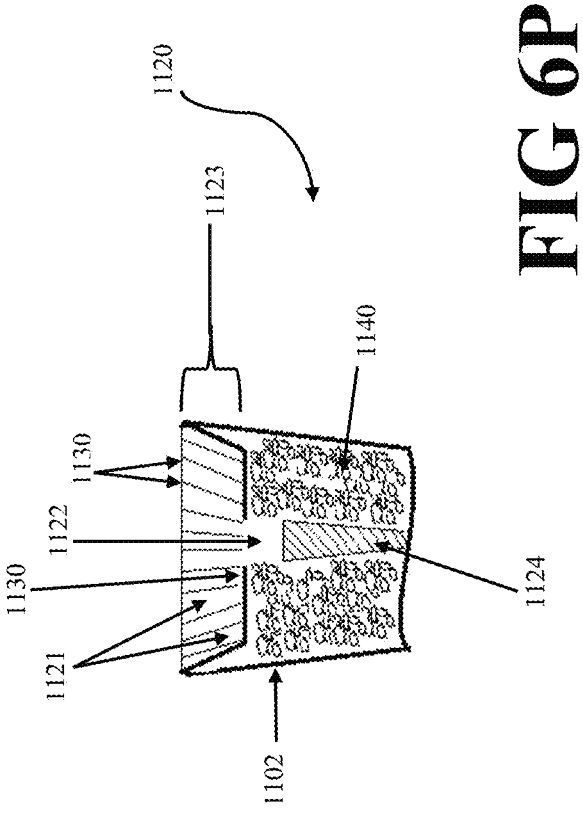
FIG. 6P is a cross-sectional side view of a distal end of an embodiment of a filled cone with a fluid core folded by an embodiment of the folder tip with an axial pin.
Figure 6O:
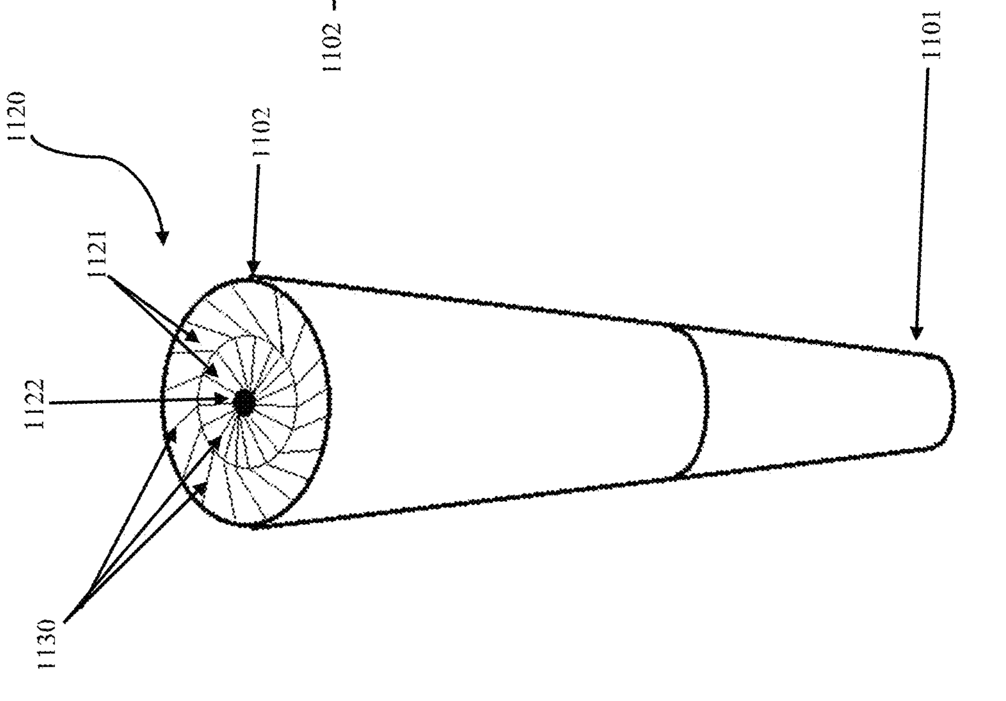
FIG. 6O is a perspective view of an embodiment of a cone folded by an embodiment of the folder tip with an axial pin.
Figure 7B:
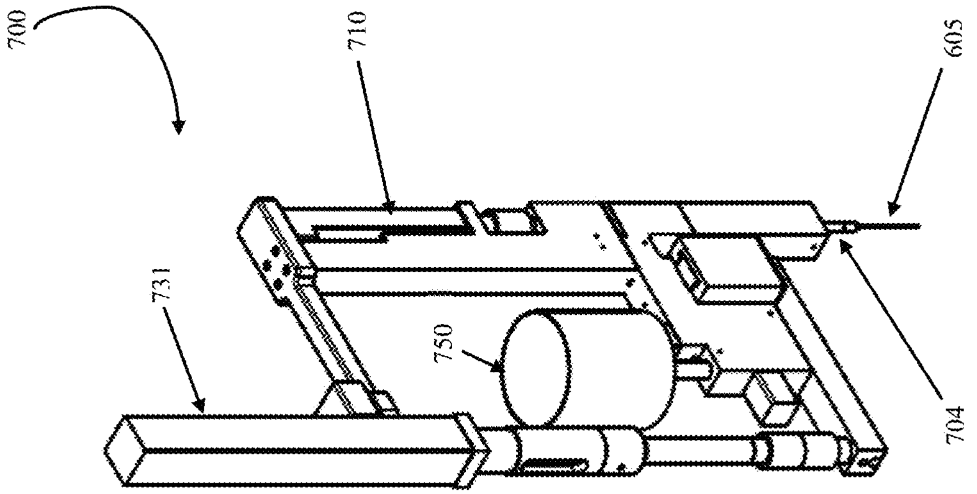
FIG. 7B is a perspective view of an embodiment of a fluid injector station.
Figure 7A:
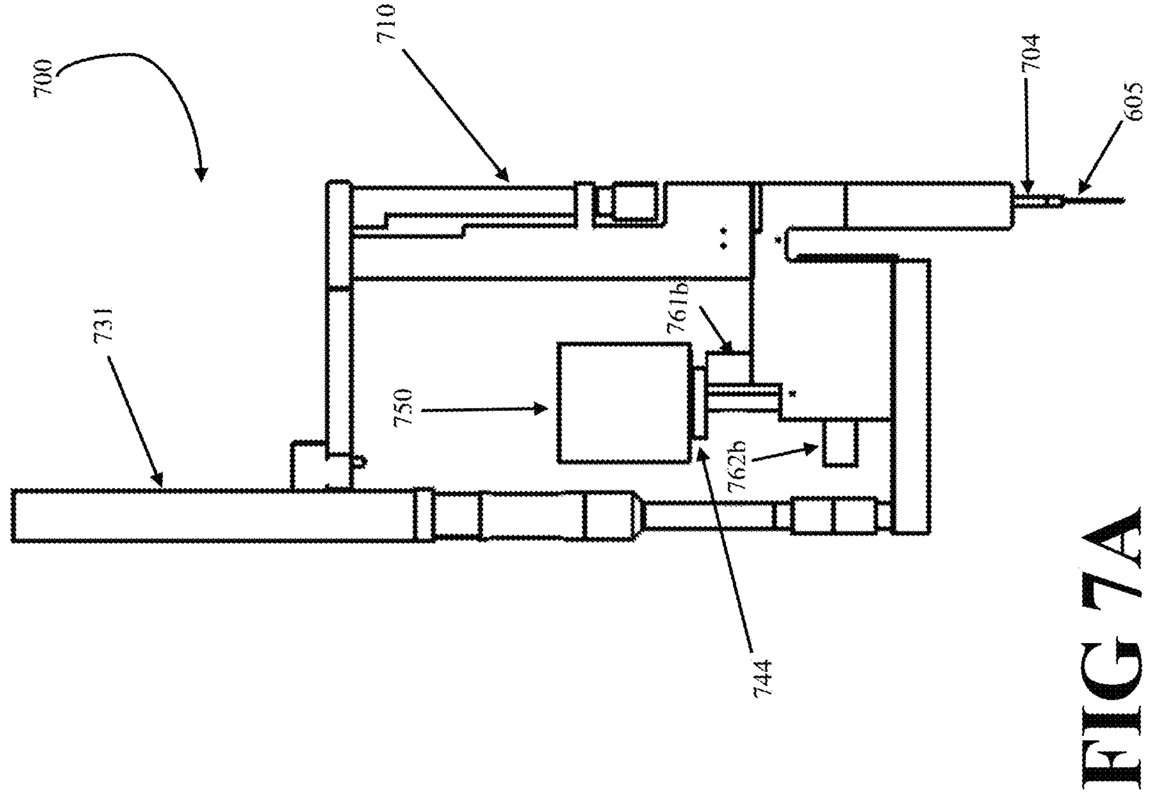
FIG. 7A is a side view of an embodiment of a fluid injector station.
Figure 7C:
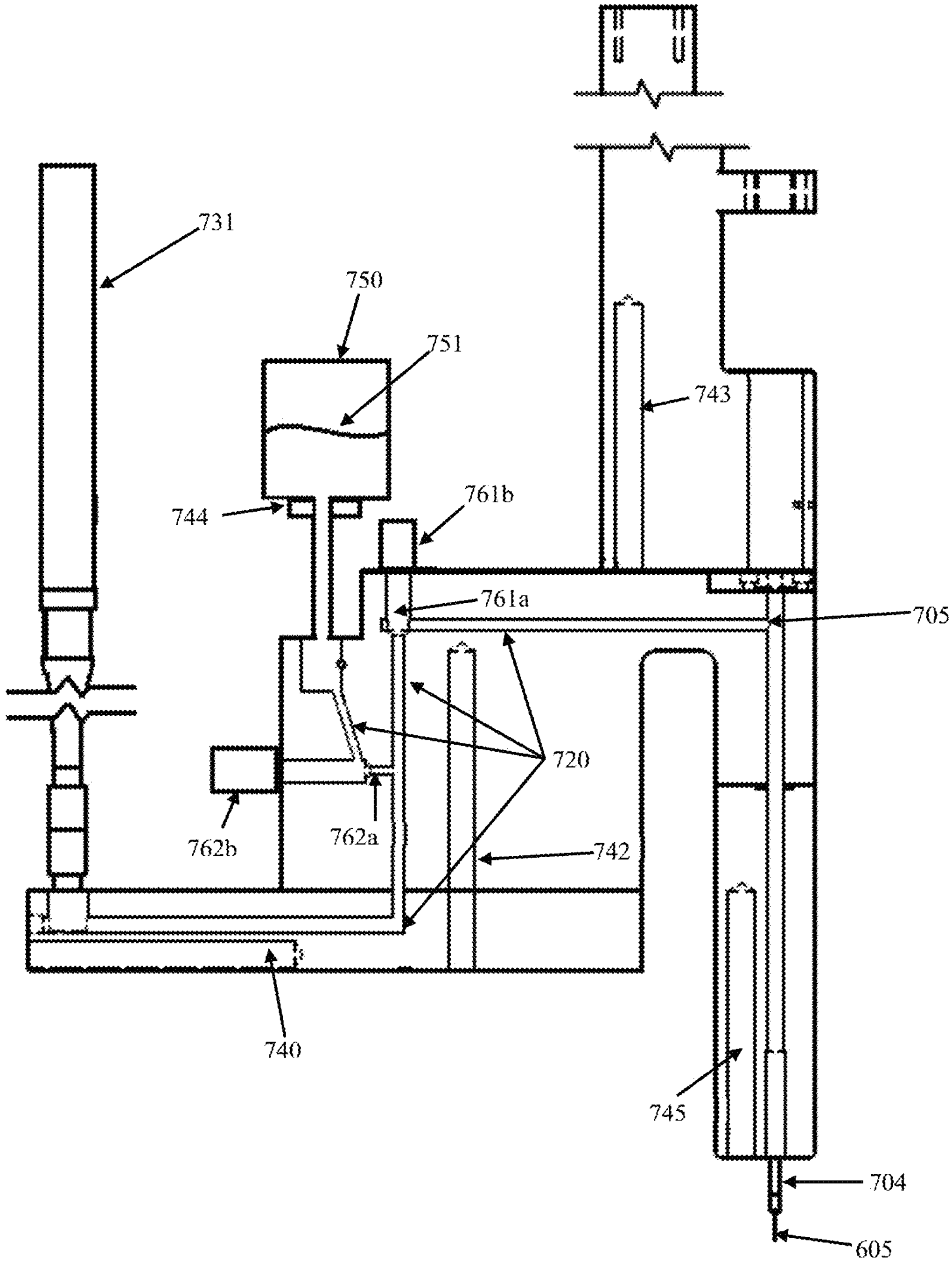
FIG. 7C is a cross-sectional side view of an embodiment of a fluid injector station.
Figure 7D:
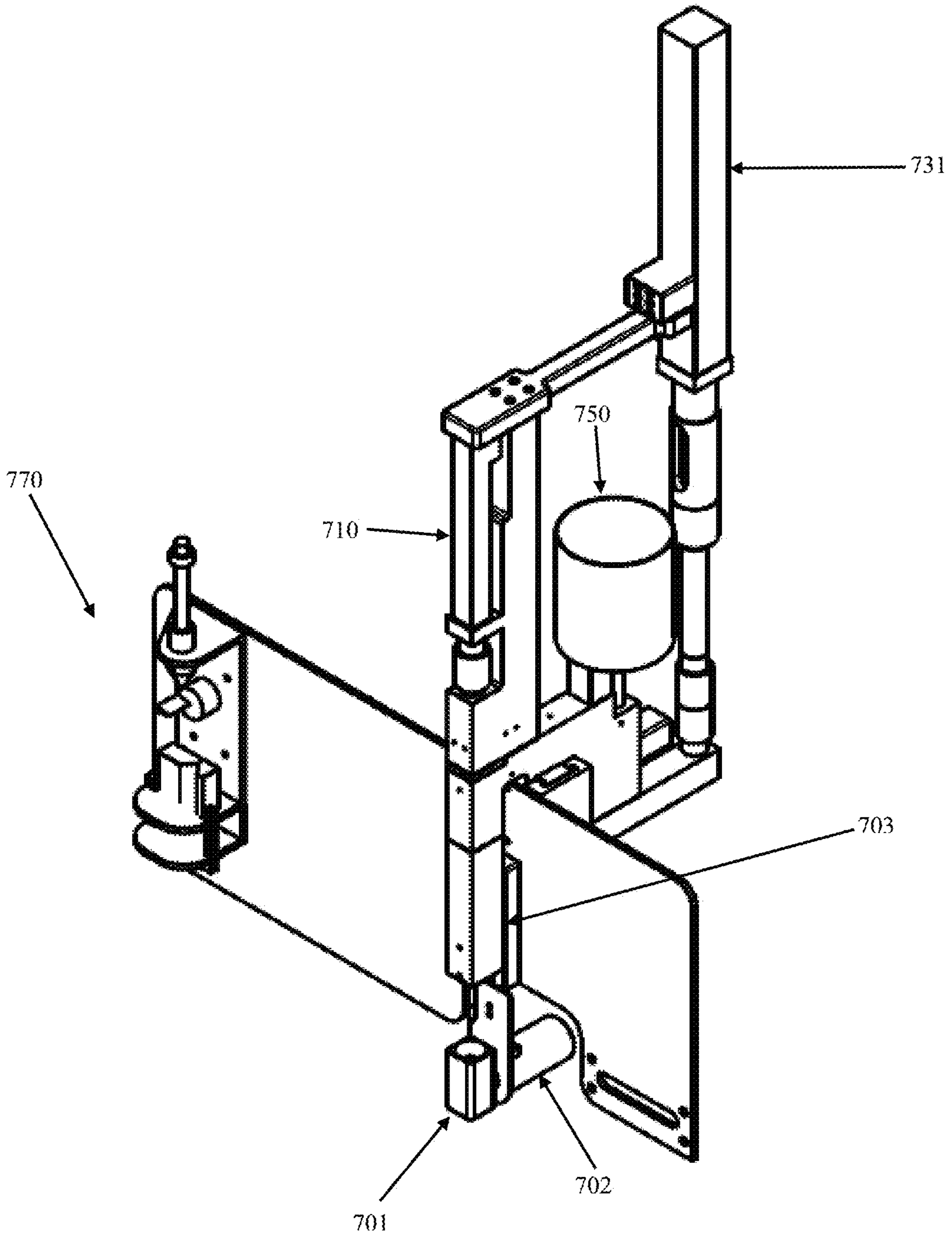
FIG. 7D is a perspective view of an embodiment of an injector station and gas purge packaging station.

In one embodiment, the folding tip 670 includes and exterior circumferential surface 672, an interior circumferential surface 673, an axial pin 671, and a contact edge 674 as shown in FIGS. 6L-6N. Preferably the cross-section of the folding tip is circular, and preferably the diameter of the contact edge 674 is less than the largest diameter of the distal end of filled cone 1120. The exterior circumferential surface 672 of the folding tip 670 may be conical such that the angle $\alpha$ mates against the angle of the surface 316 of cavity 313 of a die (for example die 310). The interior surface may also be conical. Preferably, the angle $\beta$ of the interior surface is between 80° and 85°. The interior circumferential surface terminates at the axial pin and contact edge, respectively. During the folding process, the folding tip may be placed at the distal end of the filled cone 1120 such that the axial pin 671 is below the rim 1103 of the distal end 1102 of filled cone 1120. As the fingers 642 and 652 converge, the axial pin prevents the fingers from completely collapsing the paper of the cone, and the paper of the cone is pressed against the axial pin. The folding tip 670 is pressed toward the filled cone 1120 such that the paper of the distal end of the cone slides up the axial pin and is bounded by the interior circumferential surface 673. The contact edge 674 presses the paper of the cone into the leaves within the cone, crimping the paper of the cone in on itself (see generally, fold lines 1130 of the folded portion of the cone (1121) and into the cone while the axial pin prevents the paper of the cone from completely covering the leaves. In this way, a portion of the paper of the cone is pushed into the interior of the cone, while a portion of the paper cone protrudes beyond the level of the leaves 1140 (and any fluid 1124 where the filled cone is injected with fluid) creating a circumferential lip 1123 around the cone. Also in this way, the end of the cone is folded to prevent the escape of leaves while leaving a small hole 1122 in the end of the cone. Thus, as shown in FIGS. 6O-6P the filled cone 1120 has a proximal end 1101 (mouth) and a distal end 1102 (tip), a circumferential lip of paper 1123, folded paper 1121 inside the circumferential lip, and an access hole 1122, approximately in the center of the folded paper 1121 such that the rim 1103 of the filled cone 1120 is folded down and in toward the center of the diameter of the cone.

In one embodiment, the length of an unfolded cone is between approximately 4 inches and 4.5 inches in length. It was found that folding the distal end of the cone such that the folded portion pressed and contacted the leaves inside the cone was better suited to ensuring that leaves within the cone did not freely pour out of the cone when the cone was inverted (particularly in folded cones having an access hole 1122) and it improved lighting the distal end of the cone as opposed to leaving an air gap between the leaves in the cone and the folded paper. Additionally, it was found that folding the cone such that the circumferential lip 1123 extended between approximately 2 mm and 5 mm produced optimal results while maximizing the interior volume of the cone that could be filled with leaves.

A number of benefits were found when folding the tip of the cone to provide the access hole 1122 in the distal end of the cone as well as creating a circumferential lip of paper 1123 as opposed to completely sealing the cone either by a full button fold or by twisting the paper of the cone closed. One benefit is that the hole provides an access point for a needle that can then be inserted into the cone to fill the cone with a fluid core but without having the needle pierce through layers of cone paper. It was found that attempting to pierce through the layers of paper often displaced the leaves within the cone, or lead to uneven compacting of the leaves which detrimentally affected the burning of the cone. The hole ensures that the needle does not meet excess resistance from the paper, and is able to penetrate the length of the cone, through the leaves, without unnecessarily compacting the leaves or causing the paper to push into and displace the leaves at the top of the cone.

Additionally, the hole allows for the creation airflow through the cone when lighting the filled cone. As a flame is brought proximate to the filled cone, air may be drawn through the cone by creating a vacuum at the small diameter end of the cone, thereby drawing the flame into the cone to contact the leaves and core. That assists in lighting the center of the cone where the fluid core was deposited. Without the hole, when the tip is closed due to a complete fold or twisting closed of the paper, it is difficult to create a vacuum in the unlit cone. When a flame contacts a completely closed tip, it was found that the flame would light the paper, and then migrate, or run, down the side of the cone burning the paper rather than the leaves. While the leaves would eventually light, the run of flame tended to cause uneven lighting of the leaves (e.g. lighting the leaves in the vicinity of the run, rather than uniformly across the diameter of the cone) which contributed to an uneven burn rate for the filled cone. It also meant that the leaves along the outside of the cone (proximate to the paper) would ignited first, leaving the fluid filled core unlit. By adding the hole to the tip of the folded cone, when a vacuum is applied to the cone (drawing air in from the distal end and out through the proximal end), the flame is drawn directly into the center of the cone and into the fluid core, to (particularly where the fluid is a flammable oil) reliably light the core and centrally located leaves. That results in burning away of the folded paper first (before the paper of the cone surrounding and holding the leaves), which in turn helps contain the leaves as the cone burns, and it contributes more uniformly lighting and progressive burning of the leaves. It was found that providing a folding tip with the foregoing structure created more reliably uniform folds in the end of the filled cone and simultaneously provided an airflow hole in the paper cone.

Additionally, it was found that even with the access hole, leaves within the cone would not consistently uniformly light, and there was risk of flame running down the length of the cone. However, by forming the circumferential lip of paper, as the flame is drawn into the cone through the access hole, it lights the more flammable circumferential lip of paper concurrently. That is, the circumferential lip of paper provides a mass of material, more flammable than the leaves and which mass of material surrounds the distal end of the cone such that the paper lights the circumference of the distal end and forms a strong, uniform cherry at distal end while preventing flame from running down the side of the cone.

In one embodiment, after the cone is folded but while the folding tip remains proximal to the folded top of the cone, injector needle 605 may be extended into the cone, either piercing the folded top or, when the preferred folding tip with axial pin is used to fold the top, passing through the hole formed around the axial pin. The injector needle may be formed coaxially with the folding tip and extend through the folding tip. With reference to FIGS. 6F-6G, the injector needle 605 is inserted into the distal end of leaf filled, folded, cone 1120. Generally, it has been found that inserting the needle approximately 80% of the length of the cone yields optimal results. Inserting the needle too far results in fluid placement too close to the proximal end, and can cause fluid to oversaturate the proximal end of the cone. If the fluid is not inserted far enough, then the benefits of the fluid are not fully appreciated as the product is used. In FIG. 6G, the injector needle 605 is extracted, and as the needle is extracted, a fluid 1124, such as an oil, is extruded from the needle and into the filled cone 1120. In one embodiment an actuator applies variable pressure such to extrude a variable amount of fluid as the needle is extracted. Preferable less pressure toward the distal end of filled cone 1120, with increasing pressure as the needle is further extracted and progresses toward the distal end of filled cone 1120. When a tapered cone is being injected with fluid, this allows less fluid to be deposited toward the proximal end of the cone where the cone is narrower and more fluid to be deposited toward the thicker distal end of the cone.

In one embodiment, after folding is complete, (and in some embodiments after any desired fluid is injected and the needle retracted) the cone conveyor 300 moves the die with the filled, folded cone to a quality control station 800. For example, the cone conveyor 300 rotates the die 310 holding the filled, folded cone to the quality control station and die actuator 350 separates clamping segments 311, 312 of die 310 and releases the cone. In one embodiment, a cleaning actuator inserts a cleaning brush into the cavity 313 of the die to ensure that the filled cone is released and to clean the hole in the die. This helps prevent residue from building up within the die which may otherwise cause cones to stick within the die. The cone may be deposited on a quality control hopper 801.

Figure 8:
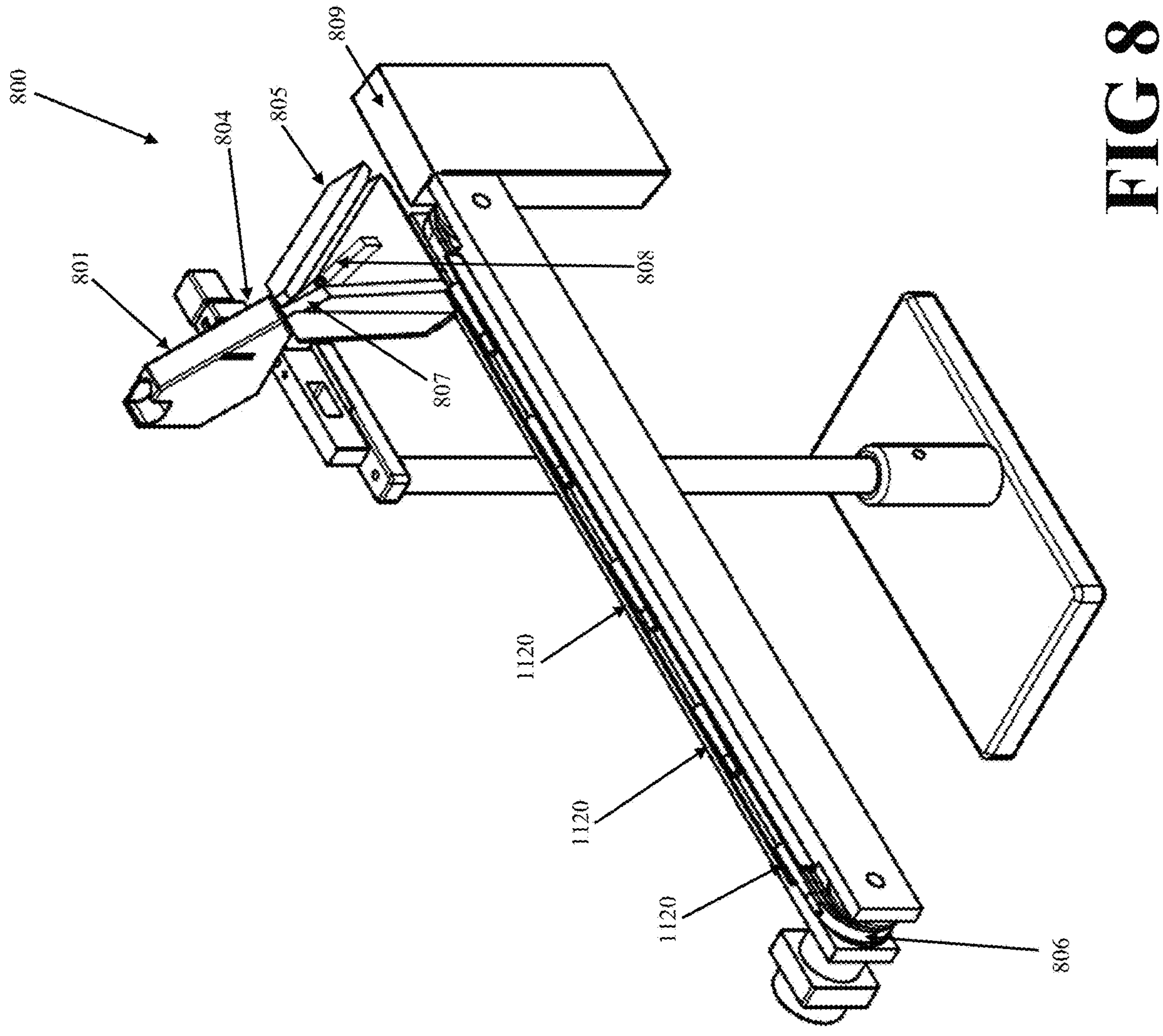
FIG. 8 is a perspective view of an embodiment of a quality control station.

With reference to FIG. 8, in one embodiment, a quality control station includes one or more sensors that check attributes of the filled cone against preset values stored in the control system and determine whether the filled cone is acceptable. For example, one or more sensors, such as a camera or scale may analyze the shape or weight of the cone. In one embodiment, the quality control hopper 801 of the quality control station temporarily holds the filled cone for inspection by at least one quality control sensor (such as 804) and includes an exit chute 805. If the attributes of the cone fall within an acceptable tolerance, the cone is accepted. The cone may be released from the quality control hopper 801 to the exit chute where diverting arm 807 may direct the cone to a conveyor 806 (alternately, the cone may be directed to a packaging container or placed in a sealable package). If the attributes of the cone do not fall within an acceptable tolerance, a diverting arm 807 may be moved by an arm actuator 808 to block the cone from the conveyor. The diverting arm diverts the cone into a reject bin 809. The diverting arm actuator 808 then moves the diverting arm 807 to allow subsequent cones to be deposited onto the conveyor. In another embodiment, the exit chute 805 temporarily holds the filled cone for a further inspection, such as an optical inspection by optical sensors. The cone may then be sent to a conveyor 806 that accommodates the filled cones and allows for further inspection, or, in alternative embodiments, moves the cones for further processing such as core filling. Filled cones may then be accepted or rejected and sent from the conveyor 806 to sealable package containers or the reject bin.

As noted, after an initial quality control check of the cones that are filled with leaves and folded (or in some embodiments without any quality control step, but simply after the cones are filled and folded), the cones are moved by a conveyor, for example conveyor 806, to an injector station 700. In such embodiments, the injector needle may be arranged as a separate core injector station.

FIGS. 7A-7D depict various aspects of an embodiment of a separate injector station 700. As shown in FIG. 1A, an injector station 700, is arranged apart from the folding station 600 of the packaging system. In one embodiment, filled cones 1120 are transported to a receptacle 701 by conveyor 806. For example, a conveyor 806 transports the filled cones and deposits each cone in the receptacle 701. A receptacle actuator 702 may adjust the positioning of the receptacle with respect to the conveyor, such as by tilting it back and forth, to ensure that the cone is deposited properly. In one embodiment, after the cone is deposited, a positioning actuator 703 adjusts the positioning of the receptacle with respect to an injector needle 605, such as be sliding the receptacle closer to the needle 605. It should be understood that the needle could alternatively be moved closer to the receptacle, or both could be moved to converge with one another. Also, in place of a receptacle actuator and a positioning actuator, a single multi-axis actuator could be utilized. In a further embodiment, a robotic arm manipulates the position of the receptacle with respect to the conveyor (so that cones from the conveyor are deposited in the receptacle) and the filling station. The robotic arm may further move the receptacle from the filling station to a packaging station 770 where the cone may be placed in a sealable package and, in one embodiment, the sealable package may be purged with an inert gas and sealed. Alternatively another conveyor could be used to move filled cones from the injector station to the packaging station.

The injecting station may further include a needle slide 704, fluid circuit 720, fluid pump 731, one or more heating elements 740, and a fluid reservoir 750. The injector station may further include one or more pressure sensors (which may be integrated with valve actuators) that sense the fluid pressure within the fluid circuit. The injector station may further be equipped with valves, e.g. 761*a*, 762*a* and valve actuators, e.g. 761*b*, 762*b*, for actuating the valves to alter the flow of fluid within the fluid circuit. The injector needle 605 is hollow and is positioned coaxially with the needle slide 704. In one embodiment, the needle slide is also hollow, and includes an access port 705 along its length. The access port is in fluid communication with the hollow needle, such that fluid flowing through the access port may exit through an end of the injector needle 605. A needle actuator 710, moves the needle slide within the fluid circuit such that fluid may flow through the access port while the needle slide (and needle) move. Fluid flows through the fluid circuit and into needle slide through the access port 705 and then out through the needle 640. To control the flow of fluid, the fluid pump 731 operates to pump fluid from the reservoir into the fluid circuit. Working in conjunction with the valves, the fluid pump draws fluid from the reservoir into the fluid circuit by applying negative pressure to the fluid circuit (including the fluid reservoir 750), the fluid pump then applies positive pressure to the fluid circuit to force fluid to flow through the access port 705 and thus through the needle as the needle is retracted from the cone, thereby depositing a core of fluid within the cone. Just prior to the needle exiting the top of the cone, for example while 0.5 cm of the needle remains within the cone, the fluid pump 731 (which may work in conjunction with the valves), stops applying positive pressure to the fluid circuit and instead applies negative pressure to the fluid circuit thereby retracting fluid back up the needle (thereby preventing fluid from leaking out of the tip of the needle) and again drawing fluid out of the reservoir. The core-filled cone may then be removed from the receptacle, transferred and deposited in a second quality control station, the structure of which is similar to the quality control station 800, or may be sent to a packaging station 770 and sealed in a package.

To enhance the accuracy of the core filling, heating elements 741, 742, 743, 744, and 745 maintain proper temperature of the fluid within the fluid circuit and reservoir, thereby maintaining consistent viscosity of fluid. One or more sensors may monitor the temperature, and feedback temperature data to the control system. Additionally, pressure sensors (which may be integrated with the valves, or alternatively pressure data may be derived from the operation of the fluid pump) may transmit pressure data respecting the pressure of the fluid within the fluid circuit. By correlating one or more of the pressure data and temperature data with data respecting inherent properties of the fluid being pumped (where data respecting such inherent properties are stored in the control system) the control system determines the appropriate control of the pressure pump 731 to apply the correct pressure during the cone filling injection to ensure a uniform core fill in each cone.

Figure 9:
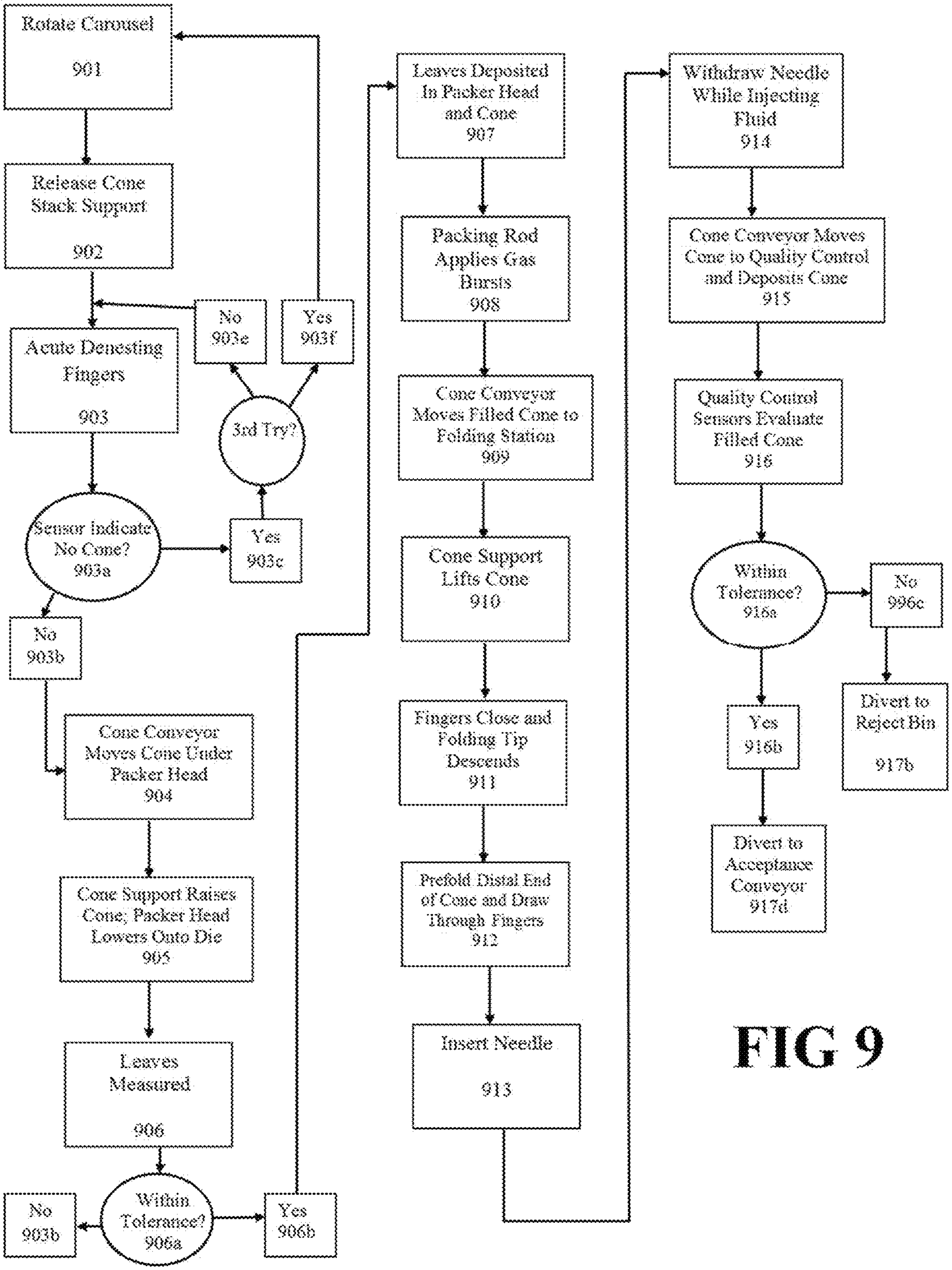
FIG. 9 is a flowchart describing the operation of an embodiment of the packaging assembly.

While each process in the packaging assembly may be conducted separately and independently, they may also be combined and used together to form a filled cone. In one embodiment, the control system operates the actuators to successively perform operation on successive cones. The following is an example of the control system operating to fill a single cone and is described in connection with the flowchart of FIG. 9. The following description is of an embodiment that includes leaves within in the hopper 401, and where at least one stack of cones is deposited in carousel 200 (though it should be understood that more or less cones could be present). It should also be understood that while the steps are recited separately for explanatory purposes, various steps may be performed simultaneously. More or less steps could also be utilized depending on the configuration of the packaging system and the desired output product.

In the process at 901, the rod actuator 250 rotates the carousel 200 with a cone stack 1100*a* to orient a cone 1100 above a die 310. At 902 the hole actuator 260 temporarily releases support of the cone stack 1100*a* and a cone is forced through the hole 236 into the die 310 and the hole actuator 260 reengages the cone stack. At 903, de-nesting fingers 361, 362 may grip cone 1100 and assist in forcing it through hole 236. The sensor 367 of the de-nesting fingers determines if a cone is gripped 903*a*. If no cone is gripped 903*c,* the sensor 367 sends a signal to the control system. The system will attempt to grab a cone three times 903*d*. If it is not the third try 903*e,* the de-nesting fingers will try to grab a cone again. If it is the third try 903*f* the control system will rotate the carousel (see 901) to move a new stack of cones into alignment and attempt the process again. If no signal is sent 903*b,* indicating a cone was grabbed and deposited into the cone die, then at 904 cone conveyor actuator 303 moves the cone conveyor 300 and the die 310 into position underneath the packer head 570 and funnel 550, aligning the open distal end of the cone with the exit hole 551 in the funnel 550. At 905 cone support actuator 562 raises the cone support 561 and cone 1100 to the proper height and packer head 570 with funnel 550 may be lowered onto the die 310. At 906 the leaves are deposited into the weigh station 510. The weigh station sensor 511 sends a signal to the control system indicating, for example, the weight of the leaves. The control system assess whether the weight is within tolerance 906*a,* such as by checking the sensor signal against a preset value stored in memory, if it is not, the sensor continues to check the weight as leaves are added. If it is 906*b,* then at 907 one or more weigh station actuators 514 move the outlet doors 512, 513 to drop the leaves into the packer head 570 and funnel 550. As the leaves fall through the funnel and into the cone, at 908, the packing rod successively applies bursts of pressurized gas. At 909 cone conveyor actuator 303 moves the cone conveyor 300 and the die 310 into position underneath the folder station 600 and aligns the cone with the folder tip 604 as vacuum removes excess leaves in the packer head. At 910, support actuator 562 raises cone support 561 and filled cone 1120. At 911 the actuators 643, 653 move the folding fingers 642, 652 toward the folding block 620 and the folding tip 604 descends onto the distal end of the cone. At 912, the folding fingers 642, 652 pre-fold the distal end of the cone and the cone is drawn through the fingers. At 913, the folding rod actuator 610 forces the folding tip 604 into the top of the pre-folded cone, and the folder tip presses the top of the pre-folded cone into the die 310 to complete the fold of the distal end of the cone. At 913, injector needle 605 is inserted into the cone. At 914, the needle is withdrawn as fluid is injected into the leaf filled cone. At 915 the cone conveyor 300 rotates and moves the die 310 to the quality control station and deposits the cone in the quality control hopper 801. At 916 sensors determine if the filled cone meets proper specification 916*a*. If it is within tolerance 916*b*, the filled cone is diverted 917*a* to an acceptance conveyor. If it is not 916*c,* the cone is diverted 917*b* to a reject bin. In an alternate embodiment, the needle and filling steps (913, 914) may occur after the quality control steps (916, 917), and in some embodiments the quality control steps (916, 917) may be repeated multiple times for a single cone. Also with respect to the pumping of fluid into the cone, the control system may monitor the temperature and pressure of the fluid and adjust the temperature, pressure, or both based on empirical data to maintain consistent flow through the needle and into the cone.

FIG. 10 is a schematic of an embodiment of a control system that is configured to control the various assemblies of the packaging apparatus. It includes a main controller 1000 having a memory 1001, input/output 1002, and a CPU 1003. The I/O 1002 may be connected to one or more I/O devices 1005 such as a display, keyboard, mouse, touchscreen, etc. The various actuators of the system may be connected to the main controller. It should be understood that the main controller could be a single computer that handles all of the signal processing or multiple computers networked together and may further include hardwired circuit controllers as well. The main controller sends signals to the actuators of the system to control the operation of the actuators. For pneumatic actuators, the main controller may be connected to a series of valves and actuate valves associated with the actuators to cause the actuators to actuate. It should also be understood that the actuators (for example, in the case of the use of a servo motor) may send feedback signals to the main controller which the main controller may use to further control the operation of the actuators or the actuators may be equipped with additional sensors to monitor their operation and send feedback to the main controller. The sensors of the system may also be connected to the main controller and send feedback to the main controller which the main controller may use to control the operation of one or more actuators. The heating elements, such as heating element 740, may be connected to and controlled by the main controller. The heating elements may further include sensors that sense the temperature of the heating elements and send feedback signals to the main controller regarding the operation of the heating elements that the main controller may use to adjust the temperature.

Although the present invention has been described in terms of various embodiments, it is to be understood that such disclosure is not intended to be limiting. Various alterations and modifications will be readily apparent to those of skill in the art. For example, while the embodiments shown depict the various components in static arrangement, it is contemplated that each could be structured in a dynamic arrangement such that processes such as depositing cones on the cone conveyor, packing the cones, and injecting the cones occur with the stations moving relative to one another, but remaining stationary relative to the cones. Accordingly, it is intended that the appended claims be interpreted as covering all alterations and modifications as fall within the spirit and scope of the invention.

What is claimed is:

1. A packer station comprising:

a weigh station, a chute, a packer head having an exit hole, a packing rod, and a packing rod actuator;

said weigh station including at least one sensor adapted to sense a product held by the weigh station, an inlet through which the product may be placed within the weigh station, an outlet, at least one outlet door, and an actuator operatively connected to the at least one outlet door to open and close the at least one outlet door;

wherein said outlet of the weigh station is positioned upstream from said chute such that product exiting the outlet of the weigh station may be directed into the chute;

wherein the chute is connected to the packer head and directs product to the packer head;

wherein a portion of the packing rod has an external circumference that is less than a circumference of the exit hole such that the packing rod may extend into the exit hole; and wherein said packing rod actuator is operably connected to said packing rod to slide the packing rod within said packer head and into and out of the exit hole to selectively plug and unplug the exit hole.

2. A packer station as in claim 1, wherein said packing rod further comprises a proximal end connected to said packing rod actuator, a distal end adapted to slide into and out of the exit hole, and a section of hollow tubing that allows a gas to be expelled out of the distal end; and wherein the section of hollow tubing is connected to a pressure source adapted to pump pressurized gas through the hollow tubing and out of the distal end.

3. A packer station as in claim 2, wherein the distal end of said packing rod further comprises a conical shape that decreases in circumference in the direction from the proximal end of the packing rod toward the distal end of the packing rod.

4. A packer station as in claim 2, wherein the packing rod actuator and weigh station actuator are coordinated such that the packing rod actuator is adapted to place the packing rod in a position that plugs the exit hole when the weigh station actuator transitions the at least one outlet door from a closed position to an open position.

5. A packer station as in claim 2, wherein the packing rod actuator is operated to actuate the packing rod to repeatedly plug and unplug the exit hole when a desired amount of product is present in the packer head.

6. A packer station as in claim 5, wherein after the desired amount of product is placed in the weigh station, the weigh station actuator is configured to open the at least one outlet door such that the desired amount of product is transferred from the weigh station to the packer head; and wherein the packing rod actuator is configured to selectively plug and unplug the exit hole at least five times.

7. A packer station as in claim 2, wherein the packing rod actuator and weigh station actuator are coordinated such that the packing rod actuator is adapted to place the packing rod in a position that plugs the exit hole when the weigh station actuator transitions the at least one outlet door from a closed position to an open position;

wherein after a desired amount of product is accumulated in the weigh station, the weigh station actuator opens the at least one outlet door such that the desired amount of product is transferred to the packer head; and wherein after the weigh station actuator opens the at least one outlet door, the packing rod actuator withdraws the packing rod from the exit hole such that a portion of the product may be allowed to pass through the exit hole and the packing rod actuator actuates to insert the packing rod into the exit hole to plug the exit hole and a first burst of pressurized gas is expelled from the distal end of the packing rod.

8. A packer station as in claim 7, wherein the weigh station actuator is configured such that after the weigh station actuator actuates to open the at least one outlet door such that the desired amount of product is transferred to the packer head, the weigh station actuator actuates to close the at least one outlet door and wherein the packing rod actuator is configured to withdraw the packing rod from the exit hole at least five times, insert the packing rod into the exit hole to plug the exit hole at least five times, and apply a burst of pressurized gas at least five times before the weigh station actuator opens the at least one outlet door again.

9. A packer station as in claim 8, wherein the bursts of pressurized gas comprise a first burst of pressurized gas at 60 psi, a second burst of pressurized gas at 60 psi, a third burst of pressurized gas at 45 psi, a fourth burst of pressurized gas at 45 psi, and a fifth burst of pressurized gas at 30 psi or less.

10. A packer station as in claim 8, wherein each burst of pressurized gas is equal to or less than the immediately preceding burst of pressurized gas applied.

11. A packer station as in claim 7, wherein at least twelve bursts of pressurized gas are applied.

12. A packer station as in claim 1, wherein the packer head further comprises an exhaust port connected to a vacuum that is adapted to selectively turn on and off.

13. A packer station as in claim 1, wherein the packer head includes a funnel that directs the product from the chute to the exit hole.

* * * * *